United States Patent
Williams

(10) Patent No.: US 10,427,639 B2
(45) Date of Patent: Oct. 1, 2019

(54) AIRBAG SYSTEMS WITH PASSIVE VENTING CONTROL

(71) Applicant: Autoliv ASP, Inc., Ogden, UT (US)

(72) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 115 days.

(21) Appl. No.: 15/867,412

(22) Filed: Jan. 10, 2018

(65) Prior Publication Data

US 2019/0210554 A1    Jul. 11, 2019

(51) Int. Cl.
*B60R 21/239* (2006.01)
*B60R 21/2338* (2011.01)

(52) U.S. Cl.
CPC ........ *B60R 21/239* (2013.01); *B60R 21/2338* (2013.01); *B60R 2021/2395* (2013.01); *B60R 2021/23384* (2013.01); *B60R 2021/23388* (2013.01)

(58) Field of Classification Search
CPC .............. B60R 21/239; B60R 21/2338; B60R 2021/2395; B60R 2021/23384; B60R 2021/23388
See application file for complete search history.

(56) References Cited

U.S. PATENT DOCUMENTS

| | | |
|---|---|---|
| 6,832,778 B2 | 12/2004 | Pinsenschaum et al. |
| 7,192,053 B2 | 3/2007 | Thomas |
| 7,195,281 B2 | 3/2007 | Williams et al. |
| 7,607,690 B2 | 10/2009 | Abe et al. |
| 7,784,828 B2 | 8/2010 | Matsu et al. |
| 7,819,425 B2 | 10/2010 | Webber et al. |
| 7,857,347 B2 | 12/2010 | Abe et al. |
| 7,878,538 B2 | 2/2011 | Abe et al. |
| 7,922,199 B2 | 4/2011 | Webber et al. |
| 8,020,891 B2 | 9/2011 | Fukawatase et al. |
| 8,226,118 B2 | 7/2012 | Rose et al. |

(Continued)

FOREIGN PATENT DOCUMENTS

| | | |
|---|---|---|
| WO | 2009019924 A1 | 2/2009 |
| WO | 2014123686 A1 | 8/2014 |

OTHER PUBLICATIONS

International Search Report and Written Opinion dated Dec. 9, 2016 for PCT/US2016/052503.

(Continued)

*Primary Examiner* — Drew J Brown
(74) *Attorney, Agent, or Firm* — Stoel Rives LLP

(57) ABSTRACT

Airbag assemblies and venting assemblies are disclosed. An airbag assembly includes an airbag cushion and a venting assembly including a vent, one or more shear tethers, and a peel tether. The shear tether(s) are configured to be drawn to a taut state by expansion of the airbag cushion to configure the vent in a first venting state. The shear tether(s) are releasably coupled to the peel tether. The releasable coupling is configured to keep the shear tether(s) releasably coupled to the peel tether. The peel tether is configured to transition from a slack state to a taut state as the airbag cushion continues to expand. When drawn taut, the peel tether produces a peel force transverse to the shear force. The peel force causes the releasable coupling to release and the peel tether to uncouple from the shear tether(s), to transition the vent to a second state.

24 Claims, 16 Drawing Sheets

(56) References Cited

U.S. PATENT DOCUMENTS

| | | |
|---|---|---|
| 8,434,786 B2 | 5/2013 | Jang et al. |
| 8,882,143 B2 | 11/2014 | Williams et al. |
| 9,150,189 B1* | 10/2015 | Nelson .................. B60R 21/239 |
| 9,393,927 B2* | 7/2016 | Kim ....................... B60R 21/239 |
| 9,676,364 B2 | 6/2017 | Williams |
| 10,053,043 B2* | 8/2018 | Miura ................... B60R 21/205 |
| 2002/0175511 A1 | 11/2002 | Dunkle et al. |
| 2005/0127653 A1 | 6/2005 | Williams et al. |
| 2006/0290117 A1 | 12/2006 | Fischer et al. |
| 2007/0132222 A1 | 6/2007 | Thomas et al. |
| 2007/0145729 A1 | 6/2007 | Ishiguro et al. |
| 2008/0303256 A1* | 12/2008 | Williams ............ B60R 21/2338 280/742 |
| 2008/0315567 A1 | 12/2008 | Fischer et al. |
| 2009/0020989 A1 | 1/2009 | Bauberger |
| 2009/0039630 A1* | 2/2009 | Schneider ........... B60R 21/2338 280/740 |
| 2009/0230663 A1 | 9/2009 | Mills et al. |
| 2010/0001498 A1 | 1/2010 | Abe et al. |
| 2010/0090450 A1* | 4/2010 | Webber ............... B60R 21/2338 280/736 |
| 2011/0031725 A1 | 2/2011 | Rose et al. |
| 2011/0309605 A1* | 12/2011 | Kumagai ............ B60R 21/2338 280/741 |
| 2012/0068446 A1* | 3/2012 | Miyata ................ B60R 21/2338 280/743.2 |
| 2014/0175778 A1 | 6/2014 | Choi et al. |
| 2014/0300094 A1* | 10/2014 | Williams ............. B60R 21/239 280/743.2 |
| 2015/0283971 A1* | 10/2015 | Fischer ............... B60R 21/2338 280/742 |
| 2015/0283972 A1* | 10/2015 | Fischer ............... B60R 21/2338 280/740 |
| 2015/0375711 A1* | 12/2015 | Umehara ............. B60R 21/239 280/740 |
| 2017/0088087 A1* | 3/2017 | Williams ............ B60R 21/2338 |

OTHER PUBLICATIONS

Non-final Office Action dated Oct. 4, 2016 for U.S. Appl. No. 14/871,248.

Notice of Allowance dated Apr. 20, 2017 for U.S. Appl. No. 14/871,248.

* cited by examiner

AIRBAG SYSTEMS WITH PASSIVE VENTING CONTROL

TECHNICAL FIELD

The present disclosure relates generally to the field of automotive protective systems. More specifically, the present disclosure relates to inflatable airbag cushion assemblies.

BACKGROUND

Airbags may be mounted within a vehicle and deployed so as to prevent a vehicle occupant from impact with a vehicular structure during a collision event. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
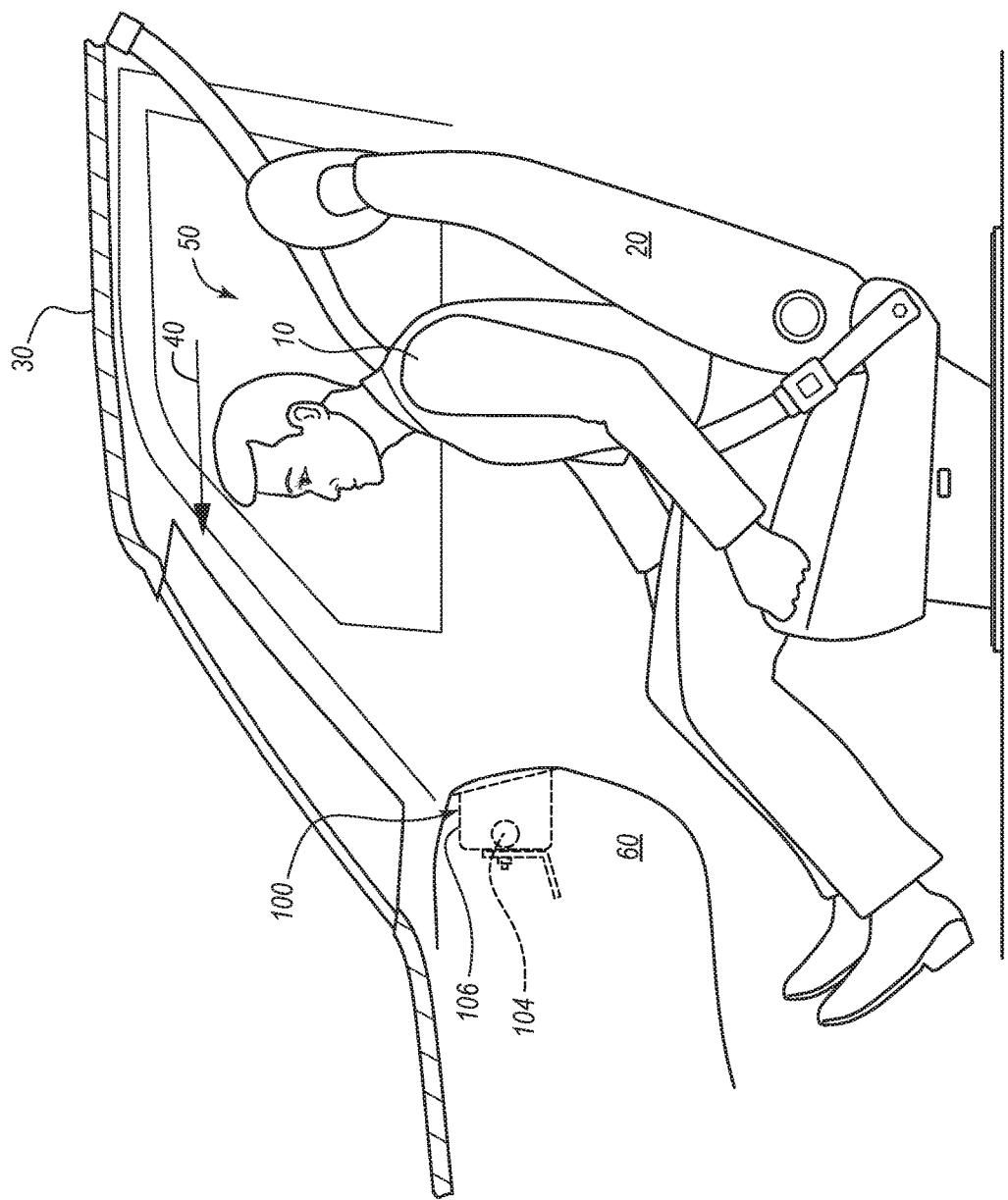
FIG. 1A is a side view of an interior of a vehicle having an airbag assembly disposed in an instrument panel prior to deployment of the airbag assembly, according to one embodiment of the present disclosure, and having an occupant nominally in a vehicle occupant position.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.).

The "venting capacity" of an airbag cushion or an airbag assembly may refer to the degree to which the airbag assembly allows inflation gas to vent from or exit the airbag assembly. For example, when one or more vents of an airbag cushion or airbag assembly are configured to allow a substantial volume of inflation gas to exit or vent from the airbag assembly in a largely unobstructed fashion, the airbag assembly may include a relatively large venting capacity. Conversely, one or more vents of the airbag assembly may more fully obstruct inflation gas from exiting the airbag assembly, and the airbag assembly may then have a relatively low venting capacity. Stated differently, one or more vents or apertures of an airbag assembly may be obstructed to a lesser degree when the airbag assembly has a relatively high venting capacity, while one or more vents or apertures may be obstructed to a greater degree when the airbag assembly has a relatively low venting capacity. Furthermore, an airbag assembly may have an intermediate or moderate venting capacity in which one or more vents of the airbag assembly may obstruct inflation gas from exiting the airbag assembly to a degree between the higher and lower venting capacities. The venting capacity of an airbag or airbag assembly may correspond with an air pressure (e.g., a pressure of inflation gas) within an interior of an airbag or airbag assembly (e.g., within an inflatable chamber defined by the airbag).

A venting capacity (e.g., an optimal venting capacity) of an airbag assembly may correspond to an air pressure (e.g., an optimal air pressure) within an airbag cushion of the airbag assembly during a collision event. For example, it may be advantageous for an airbag cushion to have a relatively low venting capacity in response to some collision conditions and a relatively high venting capacity in response to other collision conditions. More specifically, airbags that only partially inflate, or are configured with a relatively high venting capacity, during initial stages of a collision event may provide better protection for and/or reduce the incidence of injury to an occupant in an out-of-position ("OOP") condition (an OOP occupant) or other situation in which a low-risk deployment ("LRD") may be desirable. Examples of OOP conditions and other LRD situations include collision events where a child, a baby in a rear-facing car seat, or an adult positioned too close to the airbag cushion interacts with the airbag cushion during inflation and expansion of deployment of the airbag assembly. Other collision conditions may also make LRD desirable.

Although specific reference is made to front airbag assemblies (e.g., front passenger airbag assemblies), the disclosed principles and features may be applied to and used with a variety of airbag deployment systems, including knee airbags, overhead airbags, curtain airbags, and the like. Although an embodiment of a front passenger airbag assembly is shown in the drawings, it should be recognized that the disclosure is not limited to this specific context, and the principles and features described herein may apply to airbag cushions of various shapes, sizes, and configurations.

Figure 1B:
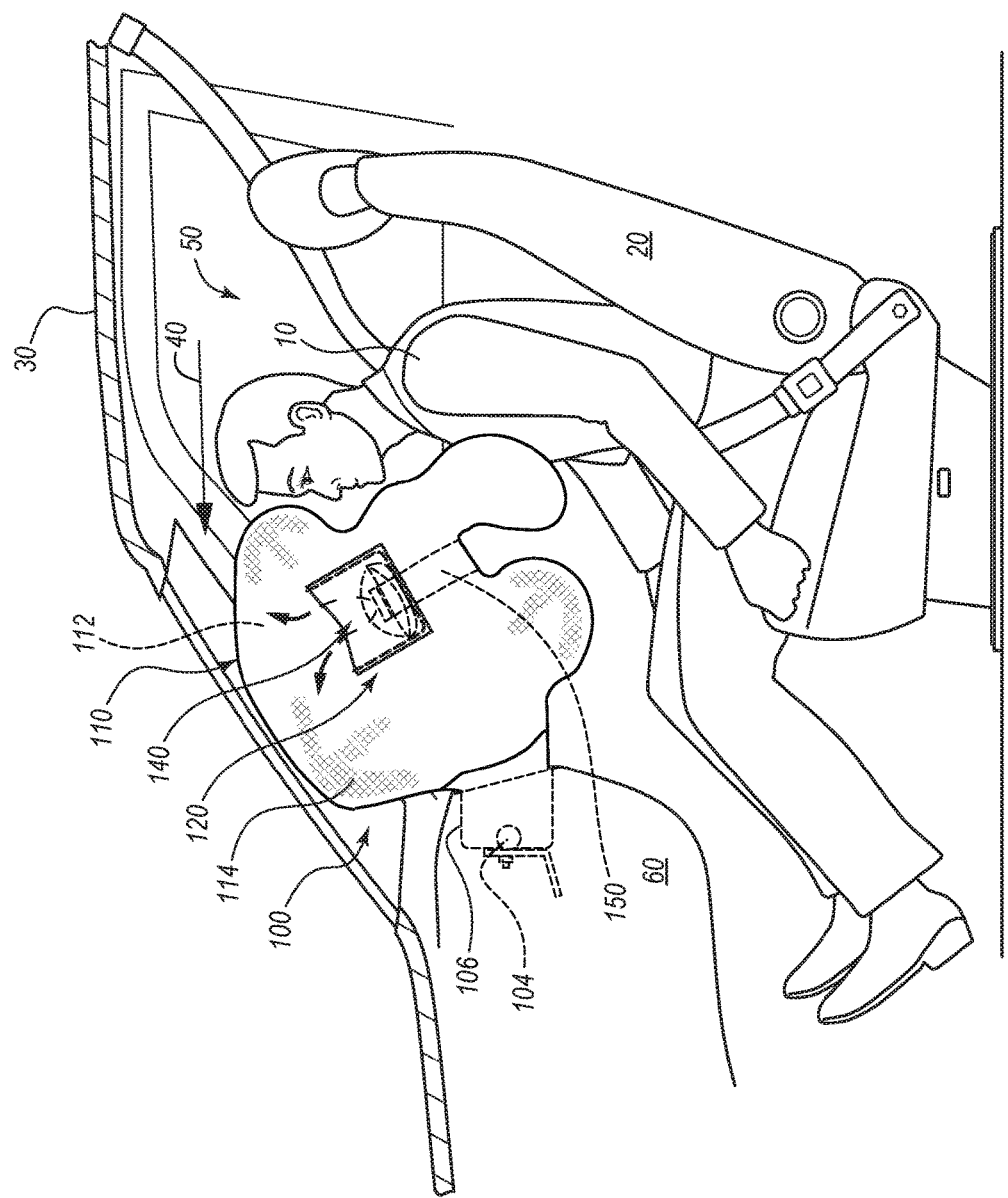
FIG. 1B is a side view of the interior of the vehicle having the airbag assembly of FIG. 1A, with the airbag assembly in an early stage of deployment.
Figure 1C:
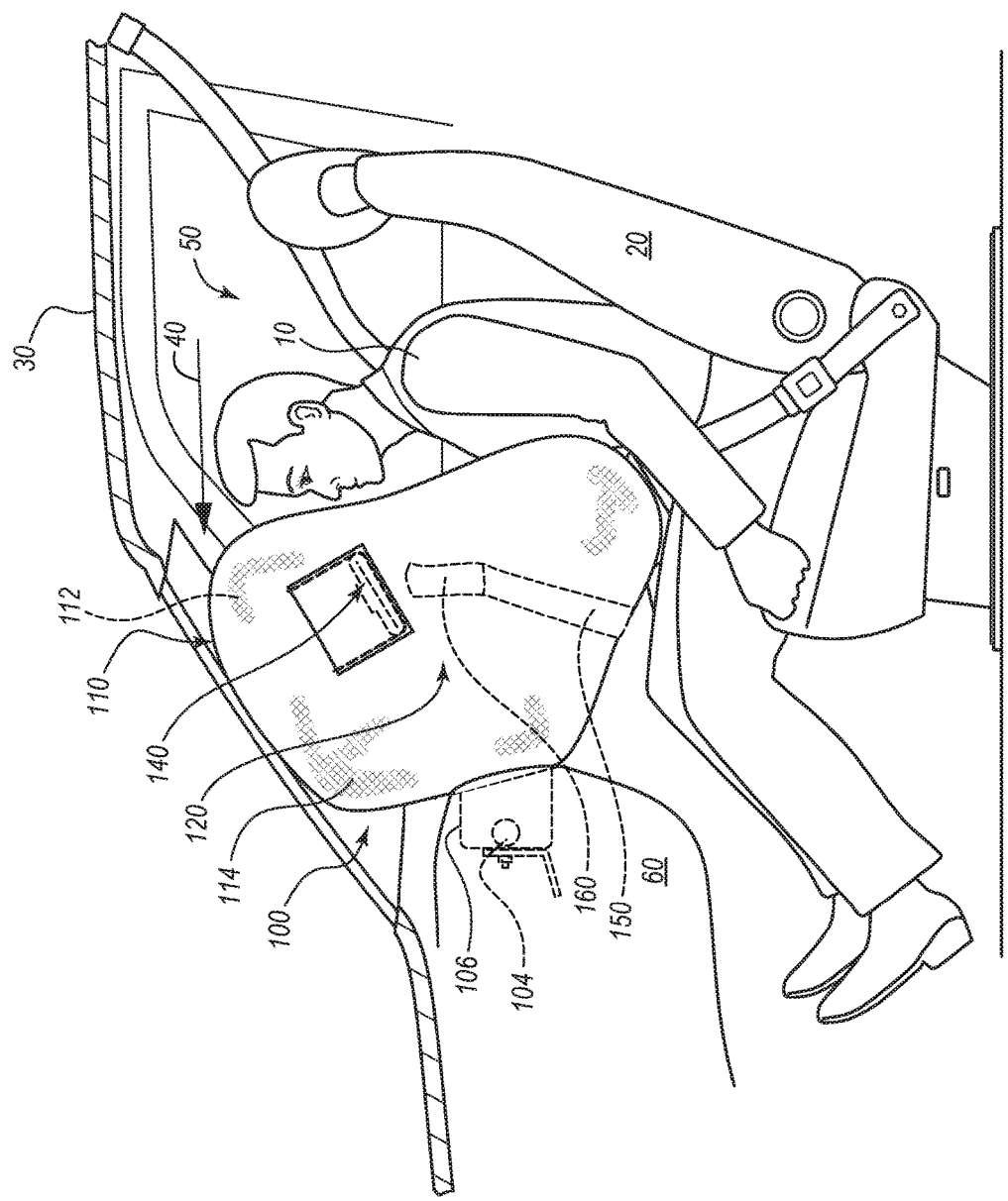
FIG. 1C is a side view of the interior of the vehicle having the airbag assembly of FIG. 1A, with the airbag assembly substantially fully deployed, but before the occupant has engaged the airbag assembly.
Figure 1D:
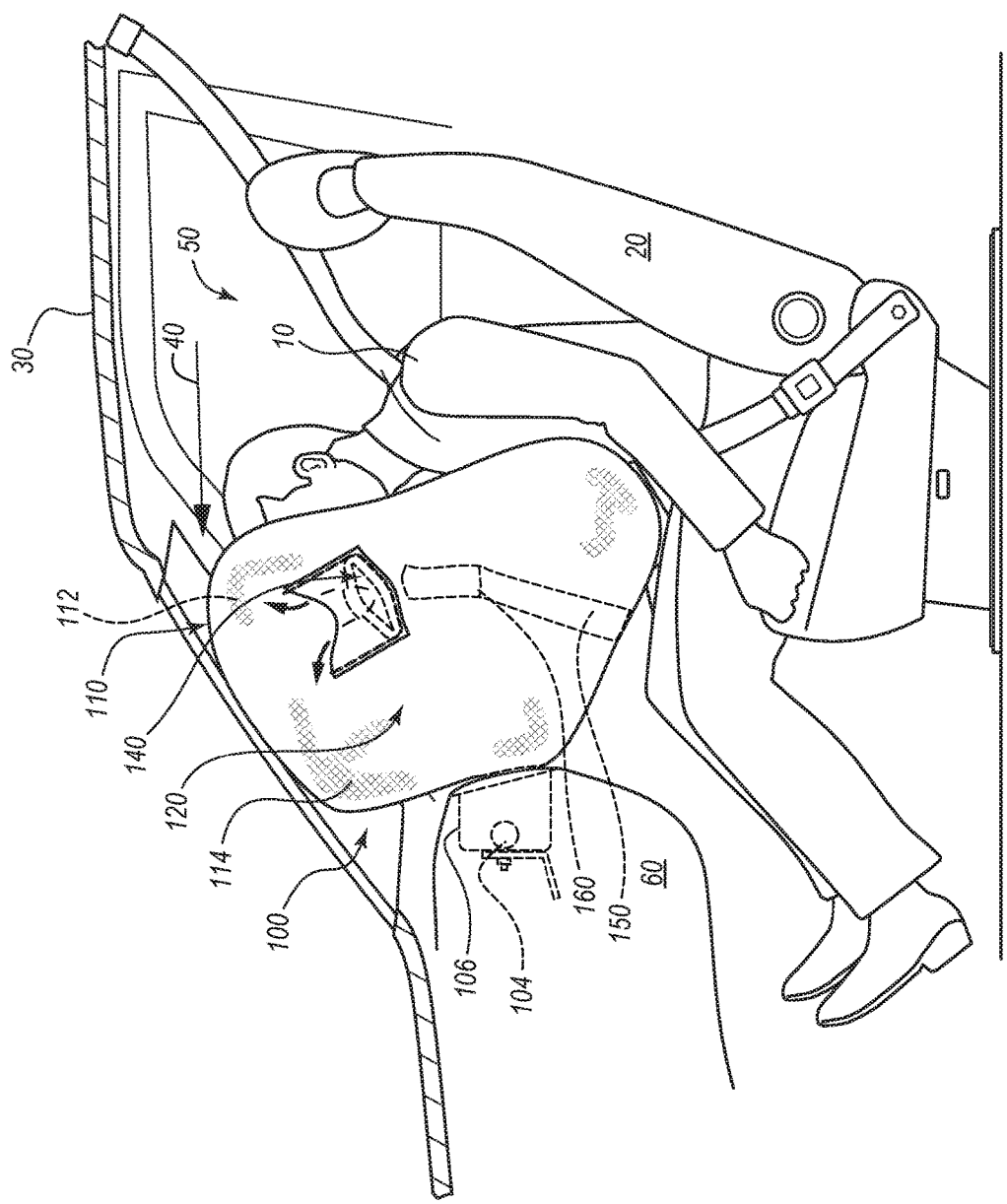
FIG. 1D is a side view of the interior of the vehicle having the airbag assembly of FIG. 1A, with the airbag assembly engaged by the occupant.
Figure 1E:
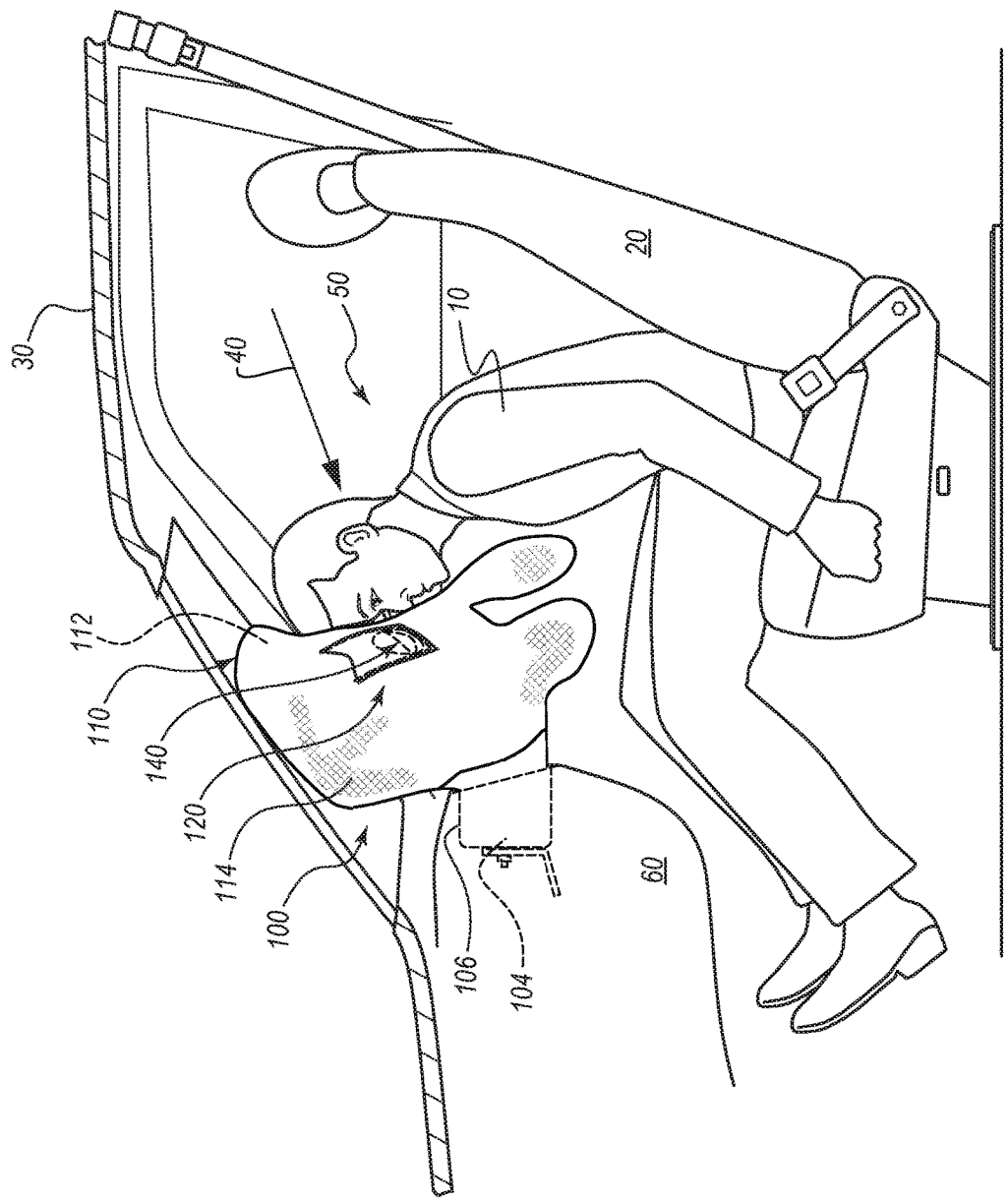
FIG. 1E is a side view of the interior of the vehicle having the airbag assembly of FIG. 1A, with the airbag assembly engaged by the occupant in an out-of-position (OOP) condition.

FIGS. 1A-1E are side views of an interior of a vehicle 30, in which an occupant 10 is seated on/in a seat 20. The vehicle 30 includes an inflatable airbag assembly 100, according to one embodiment, mounted in an instrument panel 60 of the vehicle 30. FIG. 1A is a side view of the interior of the vehicle 30 with the inflatable airbag assembly 100 in an uninflated or compact configuration prior to deployment of the airbag assembly 100. FIG. 1B is a side view of the interior of the vehicle 30, with an inflatable airbag cushion 110 of the inflatable airbag assembly 100 partially inflated and in a first state, or a first venting state. FIG. 1C is a side view of the interior of the vehicle 30, with the inflatable airbag cushion 110 at least partially inflated and in a second venting state, or a closed venting state. FIG. 1D is a side view of the interior of the vehicle 30, with the inflatable airbag cushion 110 at least partially inflated and in a third venting state. FIG. 1E is a side view of the interior of the vehicle 30, with the inflatable airbag cushion 110 at least partially inflated and the occupant 10 in an out-of-position (OOP) condition.

Referring to FIGS. 1A-1E generally and collectively, the inflatable airbag assembly 100 may include the airbag cushion 110 and a venting assembly 120. The airbag cushion 110 may be retained in a packaged (e.g., rolled, folded, or otherwise compressed) state with an airbag housing 106 disposed in the instrument panel (or dashboard) 60 of the vehicle 30, in front of and opposite a vehicle occupant position 50. The vehicle occupant position 50 may be defined by the seat 20 and may be a position in which the occupant 10 may be seated prior to and/or during a collision event, or a position in which the vehicle 30 and/or the seat 20 is designed to transport the occupant 10. The airbag cushion 110 may include a plurality of panels configured to define an inflatable chamber 112. During a collision event, an inflator 104 may be triggered, which rapidly fills the inflatable chamber 112 with inflation gas, causing the airbag assembly 100 to deploy. During deployment of the airbag assembly 100, the airbag cushion 110 may expand in a generally rearward direction, or toward the vehicle occupant position 50. While deploying rearward, the airbag cushion 110 may also expand downward, upward, and laterally to substantially occupy a void between the vehicle occupant position 50 and the instrument panel/dashboard 60.

The venting assembly 120 may include a first vent 140, a second vent (see 130 in FIG. 2B), a peel tether 150 and a shear tether 160. The first vent 140 may be a slit or aperture through a first (or inboard) panel 114 (e.g., a first side panel) of the airbag cushion 110, and may be configurable in different states (e.g., a high venting state, a low venting state, a closed state, etc.). The second vent 130 may be a slit or aperture through a second (or outboard) panel (115 in FIG. 2B), and may likewise be configurable in different states. For FIGS. 1A-1E, reference is made to the first vent 140; however, the second vent 130 also is configured like the first vent 140. During initial expansion of the airbag cushion 110, the first vent 140 may be configured by the peel tether 150 and shear tether 160, as further described below, in a first venting state (a high-capacity venting state), shown in FIG. 1B, to allow inflation gas to exit or vent from the airbag assembly 100 through vents 130, 140. Venting inflation gas from the airbag assembly 100 may reduce a pressure within the inflatable chamber 112 and cause the airbag cushion 110 to provide less initial resistance to movement of the occupant 10 in a forward direction 40 (e.g., toward the instrument panel/dashboard 60). The relatively low pressure of inflation gas within the inflatable chamber 112, as a result of the venting capacity of the first venting state, may allow the airbag cushion 110 to expand and exert a relatively low initial force on the occupant 10, who may be disposed in an OOP condition. In other words, the first venting state of the vents 130, 140 may enable LRD of the airbag cushion 110.

Following initial deployment or expansion of the airbag cushion 110, the shear tether 160 may decouple from the first vent 140 (as described in FIGS. 4A-4D), and the first vent 140 may be configured in a second state to decrease or limit the venting capacity of the airbag assembly 100. In some embodiments, vents 130, 140 may substantially close as illustrated in FIG. 1C. The first vent 140 in the second state may substantially restrict the flow of inflation gas out of the airbag cushion 110 until a predetermined pressure is achieved within the inflatable chamber 112 (e.g., as the occupant 10 impacts and exerts more force on the airbag cushion 110, changing the pressure within inflatable chamber 112). When a predetermined pressurization of the inflation gas exists within the inflatable chamber 112, such as shown in FIG. 1D, the first vent 140 may allow a limited flow of inflation gas from the airbag assembly 100 (e.g., increase the venting capacity) during ride down by the occupant 10. In other words, as the airbag cushion 110 expands, in particular downward, the peel tether 150 may cause the shear tether 160 to decouple from the first vent 140 and permit the first vent 140 to substantially close. Substantially closing the first vent 140 decreases the venting capacity of the airbag assembly 100, or places the venting assembly 120 in the second venting state, such that pressure within the inflatable chamber 112 may substantially increase. The airbag cushion 110 configured with a decreased venting capacity may provide relatively high resistance to the occupant 10 impacting the airbag assembly 100, as shown in FIG. 1D. In other words, due to the relatively high pressure within the inflatable chamber 112, the airbag cushion 110 may exert a relatively high initial force on the occupant 10 to provide adequate resistance during ride down.

During a collision event with the occupant 10 in an OOP condition, the airbag assembly 100 or airbag cushion 110 may deploy and expand to engage the occupant 10 while the vent 140 is still in the first venting state and providing increased venting capacity, and thus reduced pressure within the airbag cushion 110, as shown in FIG. 1B. The increased venting capacity of the airbag assembly 100 may avoid and/or reduce excessive impact to the occupant 10 if he or she is in an OOP condition. The airbag assembly 100 and, more particularly, the first vent 140 can remain in the first venting state to provide increased venting capacity so long as the occupant 10 remains in an OOP condition, as shown in FIG. 1E. In other words, an OOP condition of the occupant 10 may inhibit expansion of the airbag cushion 110 such that the airbag cushion 110 does not expand downward sufficiently to cause the peel tether 150 to force the sheer tether 160 to decouple from the first vent 140, thereby preserving the increased venting capacity.

Figure 2A:
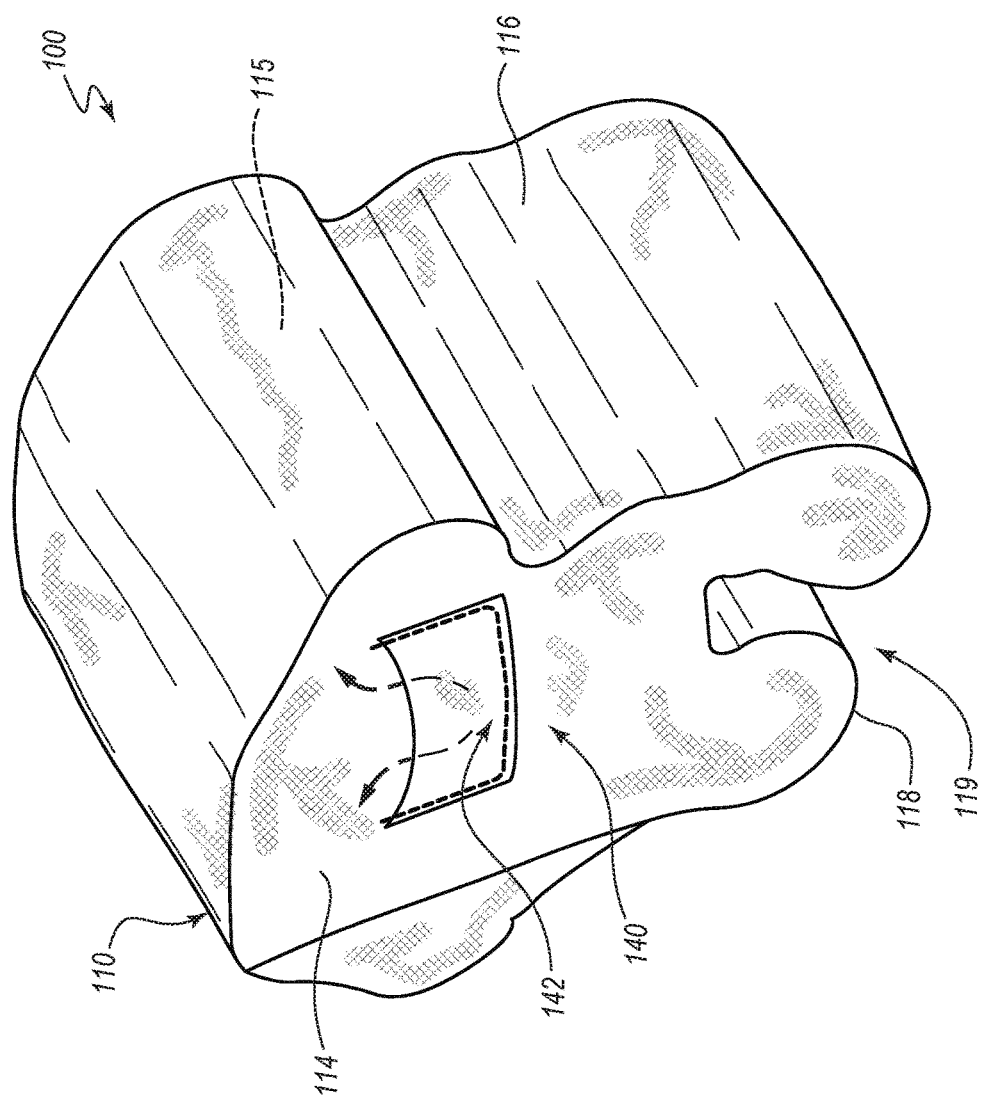
FIG. 2A is a perspective view of an airbag cushion of the airbag assembly of FIG. 1A, with the airbag assembly partially deployed and in a first venting state, substantially similar to the airbag assembly as shown in FIG. 1B.
Figure 2B:
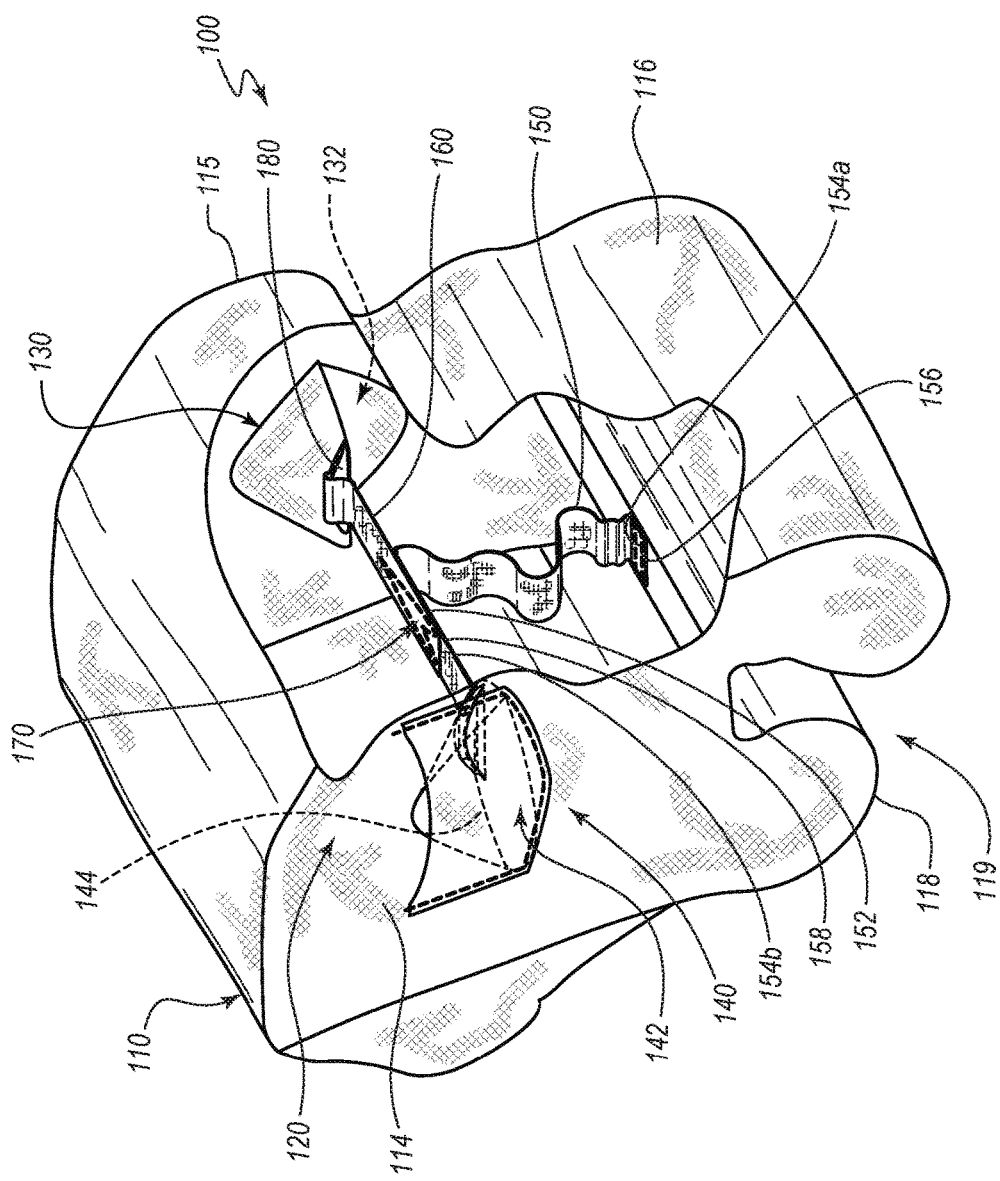
FIG. 2B is a cut-away perspective view of the airbag cushion of FIG. 2A with the airbag cushion configured in the first venting state by a venting assembly, including a shear tether and peel tether.
Figure 2C:
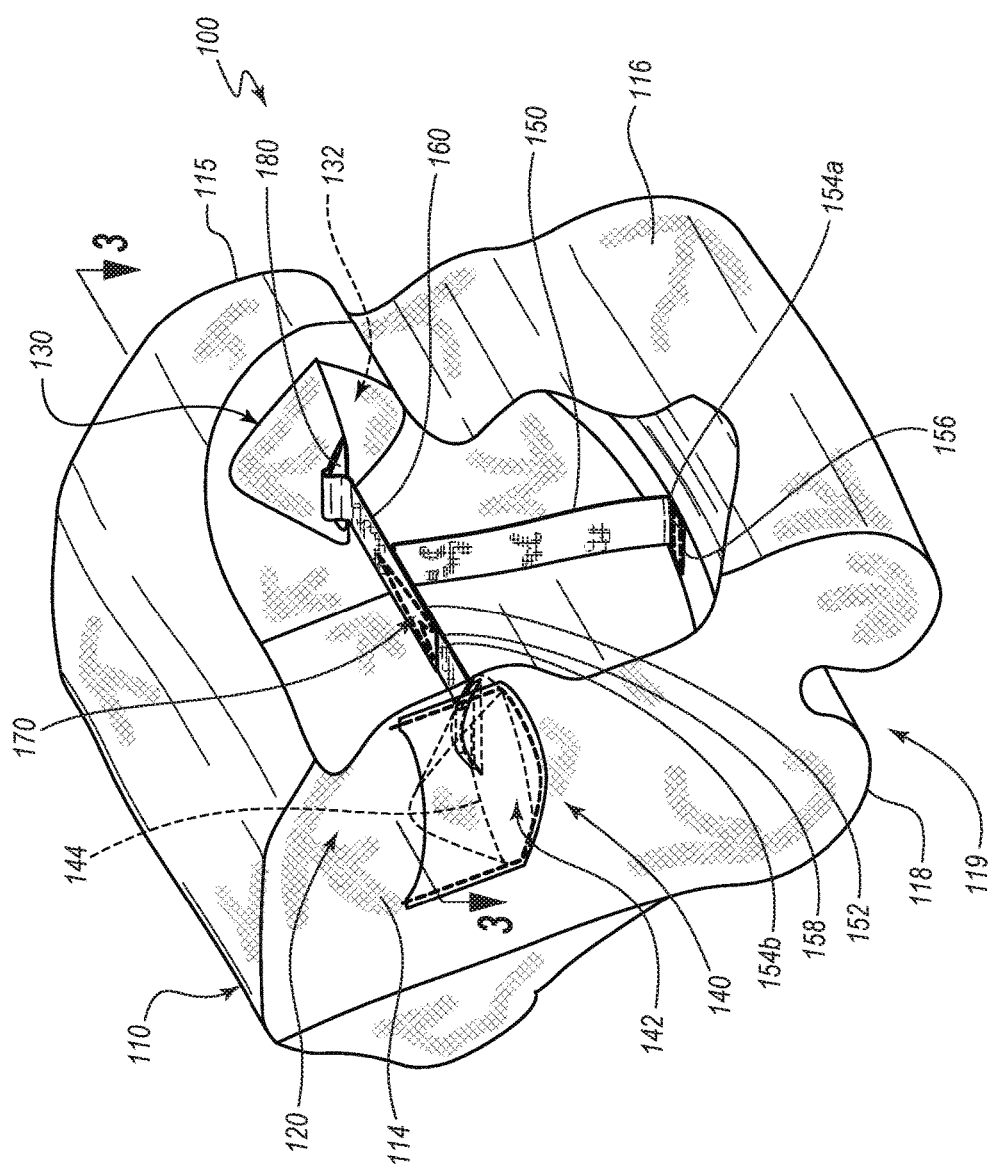
FIG. 2C is a cut-away perspective view of the airbag cushion of FIG. 2A with the airbag cushion configured in the first venting state and with the peel tether configured to begin to decouple the shear tether.
Figure 2D:
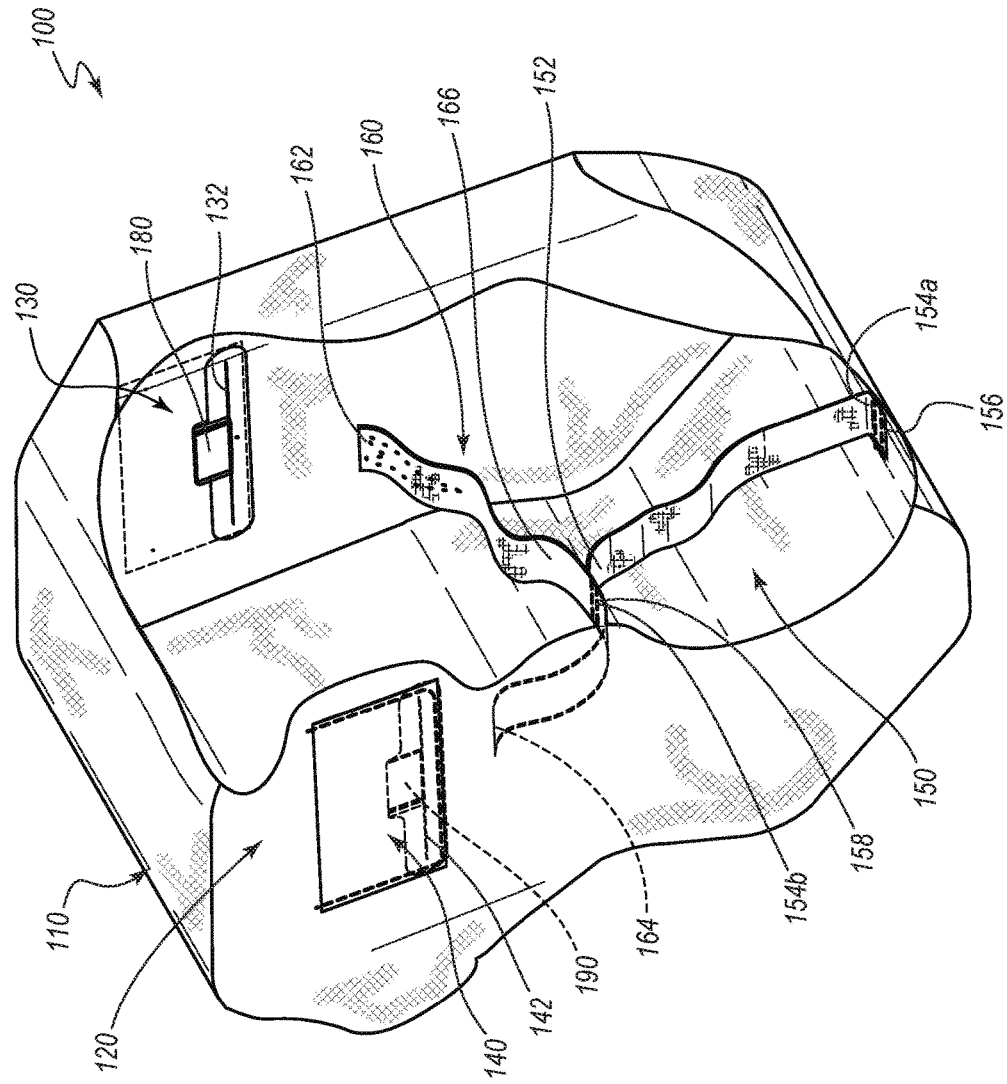
FIG. 2D is a cut-away perspective view of the airbag cushion of FIG. 2A with the shear tether decoupled and the airbag assembly configured in a second venting state.

FIGS. 2A-2D are perspective views of the inflatable airbag assembly 100 of FIGS. 1A-1E at various stages of deployment. FIG. 2A is a perspective view of the airbag assembly 100 at a substantially similar stage of deployment as in FIG. 1B. FIG. 2B is a perspective partial cut-away view of the airbag assembly 100, showing the interior of the airbag cushion 110, and the tethers 150, 160 of the venting assembly 120 at a substantially similar stage of deployment as in FIG. 2A. The venting assembly 120 is in a shear configuration. More particularly, the peel tether 150 is slack and the shear tether 160 is taut or nearly taut. FIG. 2C is a cut-away perspective view of the airbag assembly 100 at another stage of deployment, with the venting assembly 120 in a peel configuration. In this stage of deployment, both the peel tether 150 and the shear tether 160 are taut or nearly taut. FIG. 2D is a cut-away perspective view of the airbag assembly 100 with the peel tether 150 and the shear tether 160 released.

FIG. 2A is a perspective view of the airbag cushion 110 shortly after initiation of deployment. The airbag cushion 110 is partially inflated and partially expanded. The airbag assembly 100 comprises a plurality of panels including at least an inboard panel 114, an outboard panel 115, a rear panel 116, and a front panel 118 defining an inflatable chamber 112. The airbag cushion 110 may be formed of a single, unitary panel of suitable material, or of a plurality of distinct panels coupled at seams to define the inflatable chamber 112. Seams may be formed by sewing, adhesive, radio-frequency welding, taping, or any other suitable method. In at least one embodiment, the rear panel 116 and front panel 118 may be formed of a single contiguous piece of fabric and coupled at seams to the inboard panel 114 and outboard panel 115.

Vents may be disposed in and through opposing panels 114, 115 of the airbag cushion 110, and may comprise a first vent 140 and second vent (130 in FIG. 2B). The vents 130, 140 vent inflation gas from the airbag assembly 100 at a relatively high rate while the venting assembly 120 is in a shear configuration to facilitate LRD of the airbag cushion 110 (e.g., as may be desirable in the case of the occupant 10 in an OOP condition).

FIG. 2B is a perspective cut-away view of the airbag assembly 100, showing the interior of the airbag cushion 110, tethers 150, 160, and vents 130, 140 of the venting assembly 120 at a substantially similar stage of deployment as in FIG. 2A. The vents 140, 130 comprise first and second apertures 142, 132, respectively, to vent inflation gas and to facilitate LRD of the airbag cushion 110 in the case of an OOP occupant 10. As can be seen in FIG. 2B, the venting assembly 120 includes a shear tether 160 and a peel tether 150. The peel tether 150 includes a first end (see 158 in FIG. 2D), a second end 156, and a peel segment 152. The second end 156 of the peel tether 150 couples at a non-releasable anchor coupling 154a at or near an interior midpoint 119 of a lower extent of the airbag cushion 110. The first end 158 of the peel tether 150 couples at a non-releasable anchor coupling 154b at a segment near the midpoint 166 (see FIG. 2D) of the shear tether 160. The peel segment 152 of the peel tether 150 is located adjacent to or near the first end 158 of the peel tether 150. The peel segment 152 of the peel tether 150 couples at a releasable coupling 170 to the shear tether 160. The peel tether 150 is configured to be drawn taut as the airbag cushion 110 continues to expand and after the shear tether 160 is drawn taut. Each vent 130, 140 includes an aperture 132, 142, respectively. Each aperture 132, 142 may be a slit opening in the respective inboard and outboard panels 114, 115. The shear tether 160 couples at or near an upper edge of each aperture 132, 142. The shear tether 160 also releasably couples to itself, as explained below, and to the peel segment 152 of the peel tether 150 at the releasable coupling 170. As the airbag cushion 110 expands laterally, the shear tether 160 may be drawn taut and, in turn, may draw the upper edge 134, 144 of each aperture 132, 142, respectively, inward, thereby allowing inflation gas to vent through the vents 130, 140 at a high venting capacity to facilitate LRD of the airbag cushion 110 in the case of an OOP occupant 10.

In FIG. 2B, the venting assembly 120 is in a shear configuration, with the airbag cushion 110 drawing the shear tether 160 and the peel segment 152 of the peel tether 150 to a taut state. The shear tether 160, as configured in FIG. 2B, is shorter than the peel tether 150, such that the shear tether 160 may be drawn taut while the peel tether 150 is still slack, and the shear tether 160 is configured to be drawn taut by expansion of the airbag cushion 110 during inflation. In the shear configuration, the shear tether 160 is taut and the releasable coupling 170 resists shear forces (see, e.g., $F_{S1}$, $F_{S2}$ in FIG. 3) to keep the shear tether 160 and the peel segment 152 of the peel tether 150 coupled. The vents 130, 140 may be drawn inward and away from the panels 114, 115 by the shear tether 160 as it is drawn into the taut state. In the shear configuration, the venting assembly 120 may cause the vents 130, 140 and/or the airbag assembly 100 to be in a first, e.g., a high or increased, venting state, with a first or large area corresponding to each aperture 132, 142. Accordingly, the venting assembly 120 in the shear configuration may increase the venting capacity of the airbag assembly 100. Stated differently, the shear tether 160 may be drawn taut to configure each vent 130, 140 in a first venting state, which may increase an area of each aperture 132, 142, respectively, to increase a venting capacity of the vents 130, 140.

With the venting assembly 120 in the shear configuration, the releasable coupling 170 may keep (or may be configured to keep) the shear tether 160 releasably coupled to the peel segment 152 of the peel tether 150. The releasable coupling 170 may maintain releasable coupling of the tethers 150, 160 in response to, or in the presence of, a shear force that is produced by the expansion of the airbag cushion 110, the shear force being oriented/directed in a direction that is perpendicular to the panels 114, 115. See $D_1$, $D_2$, $F_{S1}$, $F_{S2}$ in FIG. 3.

Figure 3:
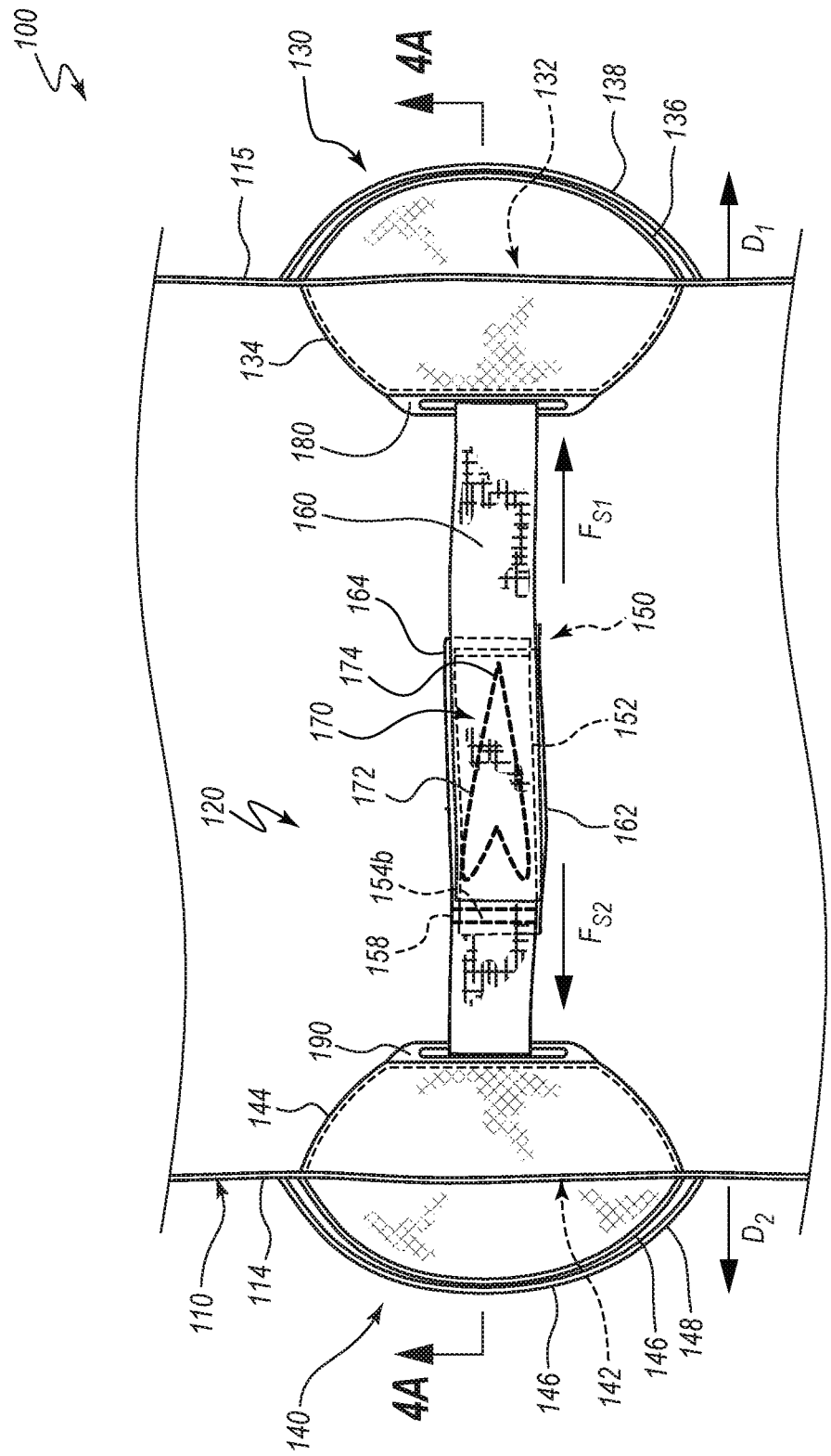
FIG. 3 is a cut-away top view of the airbag cushion of the airbag assembly of FIG. 1A, with the airbag cushion at least partially inflated and having a releasable coupling to configure the shear tether so as to place the venting assembly in the first venting state.

FIG. 2C is a perspective cut-away view of the airbag assembly 100 at another stage of deployment, with the peel tether 150 in a taut state. The view angle 3 for FIG. 3 is also shown. The venting assembly 120 is in a peel configuration. The peel configuration of the venting assembly 120 may include the peel segment 152 of the peel tether 150 and the shear tether 160 in a taut state similar to the shear configuration of FIG. 2B, with the shear force $F_{S1}$, $F_{S2}$ still present. The peel configuration of the venting assembly 120 may include the airbag cushion 110 drawing the peel tether 150 generally downward and to a taut state from a slack state as the airbag cushion 110 continues to expand. The venting assembly 120 in the peel configuration may cause the airbag cushion 110 to produce a peel force (see, e.g., $F_P$ in FIG. 4A) on the venting assembly 120. In particular, in the peel configuration, the airbag cushion 110 may produce a peel force $F_P$ on the peel segment 152 at the releasable coupling 170 through that portion of the peel tether 150 that is oriented generally downward and generally laterally transverse to the shear forces $F_{S1}$, $F_{S2}$ on the shear tether 160. The releasable coupling 170 may be configured to begin to release the shear tether 160 from itself and from the peel segment 152 of the peel tether 150 in response to, or in the presence of, the peel force $F_P$. Stated differently, a peel force $F_P$ in a direction generally perpendicular or otherwise transverse to the shear force $F_{S1}$, $F_{S2}$ may cause the releasable coupling 170 to uncouple the shear tether 160 from itself and from the peel segment 152 of the peel tether 150. More particularly, the peel force $F_P$ on the peel tether 150 can cause the peel segment 152 to peel away from the shear tether 160 to uncouple or release the releasable coupling 170.

FIG. 2D is a perspective cut-away view of the airbag assembly 100 in another stage of deployment with the peel tether 150 and the shear tether 160 released. In FIG. 2D, the airbag cushion 110 has expanded more than as shown in FIG. 2C, causing the peel tether 150 to draw further downward, which has caused the releasable coupling 170 to release. The first end 158 of the peel tether 150 remains coupled at the anchor coupling 154b to the shear tether 160 at or near the midpoint 166 of the shear tether 160. As the airbag cushion 110 continues to expand downward, the peel tether 150 may draw the shear tether 160 downward such that the shear tether 160 decouples from the vents 130, 140 and is drawn downward or away from the apertures 132, 142.

The shear tether 160 includes a first end 162 and a second end 164. During assembly of the airbag assembly 100, the first end 162 of the shear tether 160 may be passed through a first loop 190 (hereafter, first tether coupling loop) and then folded back onto the shear tether 160. The first tether coupling loop 190 may be coupled to an interior surface of the airbag cushion 110 and may be adjacent to the first aperture 142. Likewise, the second end 164 of the shear tether 160 may be passed through a second loop 180 (hereafter, second tether coupling loop) and then folded back onto the shear tether 160. The second tether coupling loop 180 may be coupled to an interior surface of the airbag cushion 110 and may be adjacent to the second aperture 132. The first end 162 of shear tether 160 may overlap the second end 164 of shear tether 160. In at least one embodiment, the first tether coupling loop 180 may be disposed toward the inboard side, relative to the vehicle 30, of the airbag cushion 110, and the second tether coupling loop 190 may be disposed toward the outboard side, relative to the vehicle 30, of the airbag cushion 110. The first and second ends 162, 164 of the shear tether 160, as well as the peel segment 152 of the peel tether 150 may overlap and may be releasably coupled together at the releasable coupling 170. The shear tether 160 and peel tether 150 remain nominally so coupled at the releasable coupling 170 until, through deployment of the airbag assembly 100, the releasable coupling 170 is released. When the releasable coupling 170 releases, expansion of the airbag cushion 110, in particular downward, may cause the peel tether 150 to draw the shear tether 160 downward such that the first and second ends 162, 164 of the shear tether 160 are withdrawn from the tether coupling loops 180, 190 and away from the vents 130, 140. The action of the peel tether 150 drawing the decoupled shear tether 160 away from the vents 130, 140 may prevent portions of the shear tether 160 from inadvertently interacting with the apertures 132, 142 and causing unexpected leakage of inflation gas. The decoupling of the shear tether 160 from the tether coupling loops 180, 190 produces a disposition in which the shear tether 160 is no longer drawing the apertures 132, 142 of the vents 130, 140 open. Thus, the venting assembly 120 may achieve a second venting state. During the second venting state, the vents 130, 140 may be substantially closed, which may significantly restrict the flow of inflation gas from the airbag assembly 100 via the apertures 132, 142, respectively. Restricting the flow of inflation gas from the airbag assembly 100 via the vents 130, 140 may cause the pressurization of inflation gas within the airbag cushion 110 to increase, which may allow the airbag cushion 110 to restrain and protect the occupant 10 during a collision event.

The airbag assembly 100 may achieve a third venting state during which some inflation gas vents from the airbag cushion 110 at a moderate rate. By way of example without limitation, during ride down, while the occupant 10 is engaged against the airbag cushion 110 in the second venting state (essentially, closed vents 130, 140), the pressure of the inflation gas within the airbag cushion 110 may continue to increase. The vents 130, 140 (and other vents) may be configured, as described below, to open or partially open once a predetermined pressure of inflation gas is achieved.

Figure 4A:
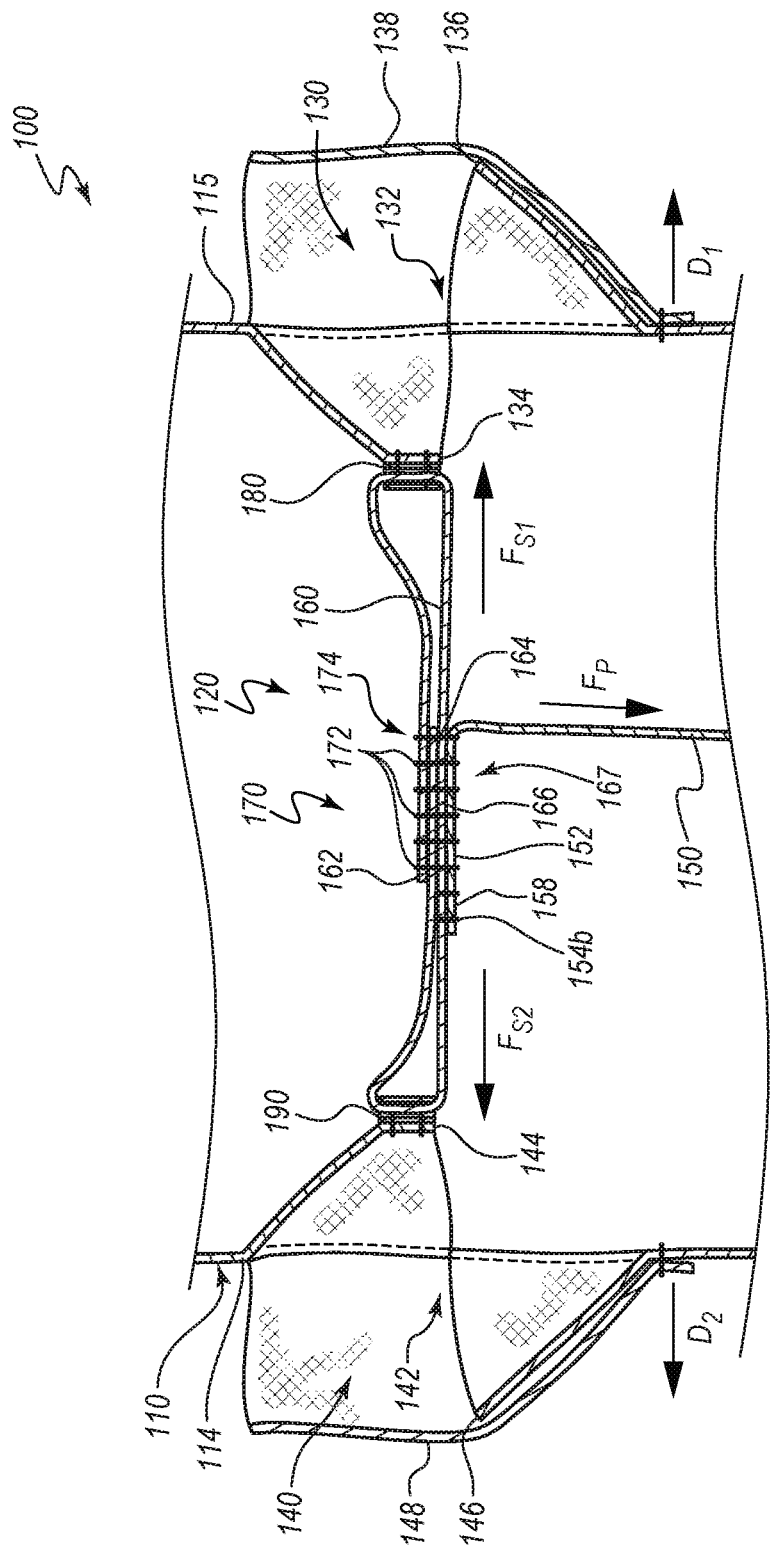
FIG. 4A is a cut-away rear view of the airbag cushion of FIG. 3 illustrating the airbag cushion substantially inflated and configured in the first venting state by the venting assembly.

FIG. 3 is an overhead cross sectional view of the airbag assembly 100 with the airbag cushion 110 at a substantially similar stage of deployment as in FIGS. 1B, 2A, and 2B. The view angle 4A of FIG. 4A is also shown. In FIG. 3, the venting assembly 120 is in the shear state, with the peel segment 152 of the peel tether 150 and the shear tether 160 drawn into a taut state, and the vents 130, 140 are in the first venting state. The shear tether 160 is coupled to the second vent 130 at the tether coupling loop 180. The tether coupling loop 180 may be disposed above the aperture 132, e.g., at or near an upper edge 134 of the aperture 132 of the vent 130 such that the shear tether 160 may draw the upper edge 134 toward the opposite side panel 114 and away from the side panel 115 through which the aperture 132 is defined. Similarly, the shear tether 160 is coupled to the first vent 140 at the tether coupling loop 190. The tether coupling loop 190 may be disposed above the aperture 142, e.g., at or near an upper edge 144 of the aperture 142, such that the shear tether 160 draws the upper edge 144 of the aperture 142 toward the opposite side panel 115 and away from the side panel 114 through which the aperture 142 is defined. In other words, the shear tether 160 is coupled at or near the upper edges 134, 144 of the apertures 132, 142, respectively, such that as the airbag cushion 110 expands laterally in directions $D_1$ and $D_2$, and the upper edges 134, 144 are drawn toward each other and away from their respective side panels 115, 114. More particularly, as the side panel 115 expands in direction $D_1$, the upper edge 134 is drawn in direction $D_2$; and as the side panel 114 expands in direction $D_2$, the upper edge 144 is drawn in direction $D_1$. The directions $D_1$, $D_2$ are generally opposite each other. This disposition of the airbag cushion 110, and particularly the shear tether 160, may produce shear forces, including shear forces $F_{S1}$ in direction $D_1$ and $F_{S2}$ in direction $D_2$, on the releasable coupling 170 after or during initial inflation of the airbag cushion 110. In this configuration, the upper edges 134, 144 of the vent apertures 132, 142, respectively are drawn inward, opening the vents 130, 140. This configuration may permit inflation gas to escape or vent through the vents 130, 140. The venting of inflation gas through the open apertures 132, 142 may permit or cause a lower edge 136 and a lower edge 146 of the vents 130, 140, respectively, to deform outward. A cover panel 138 may be disposed on an outer surface of the side panel 115 and overlaying the vent 130. Another cover panel 148 may be similarly disposed on an outer surface of side panel 114 and overlaying the vent 140. The cover panels 138, 148, may also deform or bulge outward during this first venting state.

The releasable coupling 170 may be formed via stitching, one or more adhesives, taping, welding (e.g., radio-frequency welding), heat sealing, or any other suitable technique or combination of techniques for releasably coupling the shear tether 160 to itself and to the peel tether 150. The releasable coupling 170 may comprise a plurality of breakable stitches 172 that are configured to withstand the shear forces $F_{S1}$, $F_{S2}$ without decoupling (bursting or otherwise separating). The releasable coupling 170 may thus couple together the first end 162 and second end 164 of the shear tether 160, as well as the peel segment 152 of the peel tether 150 (see FIG. 4A). In at least one embodiment, the releasable coupling 170, in particular the stitch pattern of the releasable coupling 170, may take the form of a heart shape, with an apex 174 of the heart shape oriented distally to the first end 158 of the peel tether 150 such that the breakable stitch(es) 172 at the apex 174 are the first to burst in response to the peel force $F_P$ exceeding the release threshold. The heart shape of the releasable coupling 170 provides a high shear-to-peel strength ratio. The shape of the releasable coupling 170 may also include additional shapes or combination of shapes, such as triangles, ovals, or parallel rows of varying lengths or sizes of stitching.

The first end 158 of the peel tether 150 is coupled to the shear tether 160 at the anchor coupling 154b, as further described below.

FIGS. 4A-4D are cross sectional views of the airbag assembly 100 with the airbag cushion 110 at least partially inflated, illustrating details of the releasable coupling 170 at different stages of release. The view angle of FIGS. 4A-4D is labeled 4A on FIG. 3.

FIG. 4A is a cross sectional view of the airbag assembly 100 with the airbag cushion 110 at a substantially similar stage of deployment as in FIGS. 1B, 2A and 2B. The venting assembly 120 is in the first venting state. The shear tether 160 comprises a single panel or strap having a first end 162 passing through the tether coupling loop 180, and a second end 164 passing through the tether coupling loop 190, and both ends 162, 164 coupled to each other and to the shear tether 160 at or near the midpoint 166 of the shear tether 160 at the releasable coupling 170. In other words, the first end 162 of the shear tether 160 is looped through the first tether coupling loop 180, and the second end 164 opposite the first end 162 is looped through the second tether coupling loop 190. In at least some embodiments, the releasable coupling 170 is located within a coupling zone 167 at or near the midpoint 166 of the shear tether 160. In other embodiments, the coupling zone 167 may be located other than near the midpoint 166 of the shear tether 160. The peel segment 152 of the peel tether 150 is also coupled to the shear tether 160 at the releasable coupling 170 and at a non-releasable anchor coupling 154b at or near the first end 158 of the peel tether 150. The releasable coupling 170 may be configured to releasably couple the peel segment 152 of the peel tether 150 to the first and second ends 162, 164 and a segment of the shear tether 160 at or near the midpoint 166 of the shear tether 160. The releasable coupling 170 is configured to resist a shear force $F_{S1}$, $F_{S2}$ transverse to the side panels 115, 114, respectively, to maintain the shear tether 160 drawn taut, the shear force $F_{S1}$, $F_{S2}$ produced on the shear tether 160 and the releasable coupling 170 by expansion of the airbag cushion 110 drawing the shear tether 160 taut. The releasable coupling 170 is further configured to release in response to a peel force $F_P$ transverse to the shear force $F_{S1}$, $F_{S2}$. The peel force $F_P$ is produced on the peel tether 150 and the releasable coupling 170 by expansion of the airbag cushion 110 drawing the peel tether 150 taut.

The releasable coupling 170 may comprise four layers, including the peel segment 152 of the peel tether 150, the first end 162 and second end 164 of the shear tether 160, and a segment at or near the midpoint 166 of the shear tether 160 (or other central region of the shear tether 160). As shown in FIG. 4A, the layer order of the releasable coupling 170, from top to bottom, is the first end 162 of the sheer tether 160, then the second end 164 of the sheer tether 160, a segment of the shear tether 160 at or near the midpoint 166 of the shear tether 160, then, on the bottom, the peel segment 152 of the peel tether 150. Other layer orders of the releasable coupling 170 are feasible and contemplated by this disclosure. The coupling of the shear tether 160 to the vents 130, 140 is accomplished by passing the first end 162 through the tether coupling loop 180, and passing the second end 164 through the tether coupling loop 190, and then coupling the first end 162 and second end 164 to the shear tether 160 and peel tether 150 at the releasable coupling 170.

The tether coupling loop 180 couples at an interior surface of the side panel 115 at or near or integral to the upper edge 134 of the aperture 132. The tether coupling loop 190 similarly couples at an interior surface of the side panel 114 at or near or integral to the upper edge 144 of the aperture 142. As the airbag cushion 110 expands, particularly in directions $D_1$ and $D_2$, the coupling and disposition of the shear tether 160 draws the upper edges 134, 144 of the apertures 132, 142 inward, resulting in the vents 130, 140 acquiring an open condition and placing the airbag cushion 110 the first venting state. As the upper edges 134, 144 of the apertures 132, 142 are drawn inward and the vents 130, 140 open, the lower edges 136, 146 of the apertures 132, 142 may be disposed outward to facilitate venting inflation gas. In other words, venting inflation gas may deform the lower edges 136, 146 of the vent apertures 132, 142. The venting inflation gas may also dispose or push outward the cover panels 138, 148. The disposition of the shear tether 160 may cause or permit the shear forces $F_{S1}$, $F_{S2}$ in the directions $D_1$ and $D_2$, respectively.

The expansion of the airbag cushion 110 downward (see, e.g., FIG. 2C) may draw the peel tether 150 downward, thus causing or permitting peel force $F_P$. One or more of the plurality of breakable stitches 172 may be configured to burst when the peel force $F_P$ exceeds a release threshold. As shown in FIG. 4A, the peel force $F_P$ is minimal and does not affect the releasable coupling 170. The releasable coupling 170 is configured to overcome or resist the shear forces $F_{S1}$, $F_{S2}$ so that the releasable coupling 170 remains intact and the venting assembly 120 maintains the first venting state. In other words, the stitches 172 of the releasable coupling 170 remain unbroken/unruptured at this stage and the releasable coupling 170 remains intact such that the first venting state is maintained.

Figure 4B:
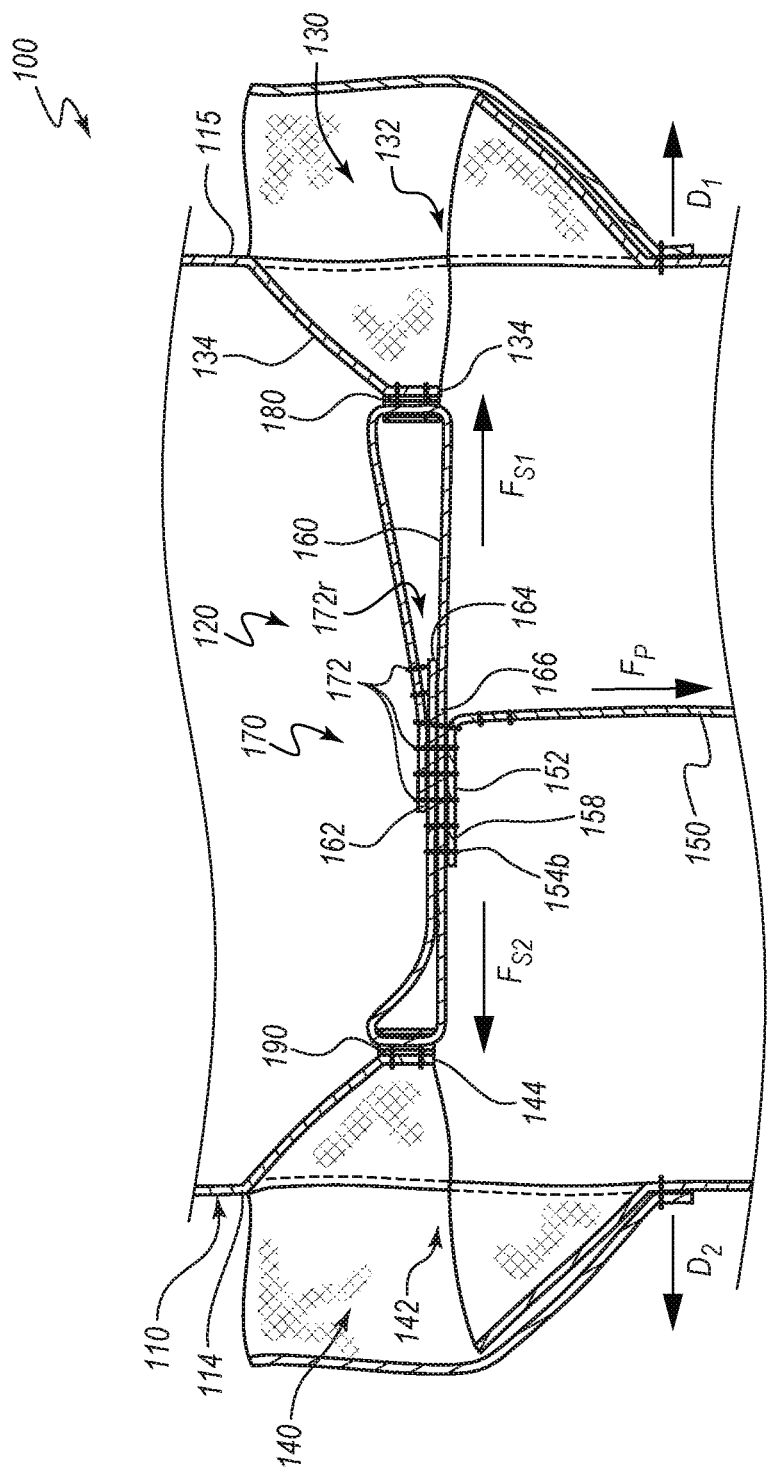
FIG. 4B is a cut-away rear view of the airbag cushion of FIG. 4A with the peel tether beginning to decouple the releasable coupling of the venting assembly to transition to the second venting state.

FIG. 4B is a cross sectional view of the airbag assembly 100 of FIG. 4A, with the releasable coupling 170 beginning to decouple as a result of increasing peel force $F_P$. The venting assembly 120 as shown in FIG. 4B is substantially similar to that shown in FIG. 4A. The vents 130, 140, including the apertures 132, 142, upper edges 134, 144, lower edges 136, 146, and cover panels 138, 148 are substantially configured as in FIG. 4A. The shear tether 160 continues to draw the upper edges 134, 144 inward. In FIG. 4B, the airbag cushion 110 has continued to expand downward such that the peel force $F_P$ has increased and exceeds a predetermined failure strength of the stitches 172 of the releasable coupling 170. The stitches 172 most distal to the first end 158 of the peel tether 150 have begun to fail and release at 172r to decouple the releasable coupling 170. In other words, the peel force $F_P$ has overcome the strength of the stitches 172 of the releasable coupling 170 such that the peel tether 150, particularly the peel segment 152 of the peel tether 150, has begun to "unzip" or peel away from the shear tether 160, simultaneously beginning to release the first and second ends 162, 164 of the shear tether 160.

In at least one embodiment, as the releasable coupling 170 begins to decouple at 172r, the shear forces $F_{S1}$, $F_{S2}$ alone may be sufficient to overcome the residual strength of the releasable coupling 170 such that the shear tether 160 may become fully decoupled even in a condition in which the peel force $F_P$ has been reduced. In other words, if the peel tether 150 happens to stop "unzipping" or peeling away from the shear tether 160, the shear forces $F_{S1}$, $F_{S2}$ may be sufficient to overcome the strength of the remaining stitches 172 such that the releasable coupling 170 may still fully decouple. The capacity of the releasable coupling 170 to decouple in the presence of suddenly diminished peel force $F_P$ may be configurable such that total decoupling may be achieved only if the peel force $F_P$ has caused a predetermined portion of the releasable coupling 170 to decouple. In other words, pre-configuring the capacity of the releasable coupling 170 to decouple in the presence of suddenly diminished peel force $F_P$ may also configure the transition (or non-transition) of the airbag assembly 100 from the first to the second venting state.

Figure 4C:
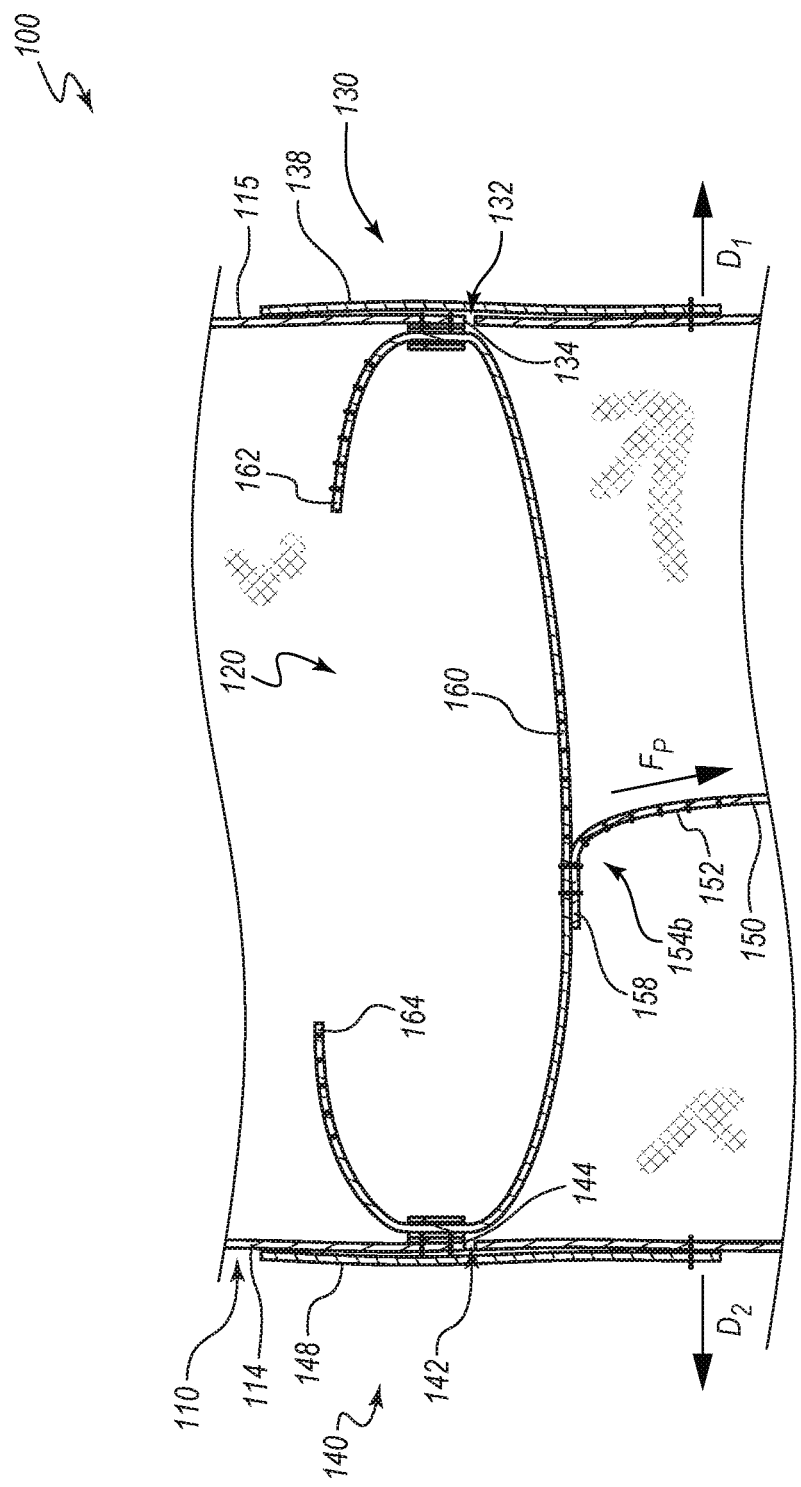
FIG. 4C is a cut-away rear view of the airbag cushion of FIG. 4A with the releasable coupling fully decoupled and the airbag cushion transitioned to the second venting state.

FIG. 4C is a cross sectional view of the airbag assembly 100 with the airbag cushion 110 at least partially inflated, and in which the releasable coupling 170 has fully decoupled and the venting assembly 120 has transitioned to the second venting state. The first end 162 and second end 164 are no longer coupled together. Because the shear tether 160 is no longer coupled in a loop, the shear force ($F_{S1}$ and $F_{S2}$ in FIGS. 4A, 4B) has dissipated, permitting or causing the upper edges 134, 144 to rebound toward the side panels 115, 114, respectively, to begin closing the apertures 132, 142 of the vents 130, 140. The pressure of the inflation gas within the airbag cushion 110 may push the upper edges 134, 144 outward in directions $D_1$, and $D_2$, respectively, to align with the side panels 115, 114. As the upper edges 134, 144 close, the cover panels 138, 148 may be drawn inward in directions $D_2$ and $D_1$, respectively, toward the side panels 115, 114 such that the cover panels 138, 148 may facilitate closing the vents 130, 140 and transitioning the airbag assembly 100 to the second venting state. With the airbag cushion 110 in the second, or lower capacity, venting state, the airbag assembly 100 may facilitate ride down and protection of the occupant 10.

Figure 4D:
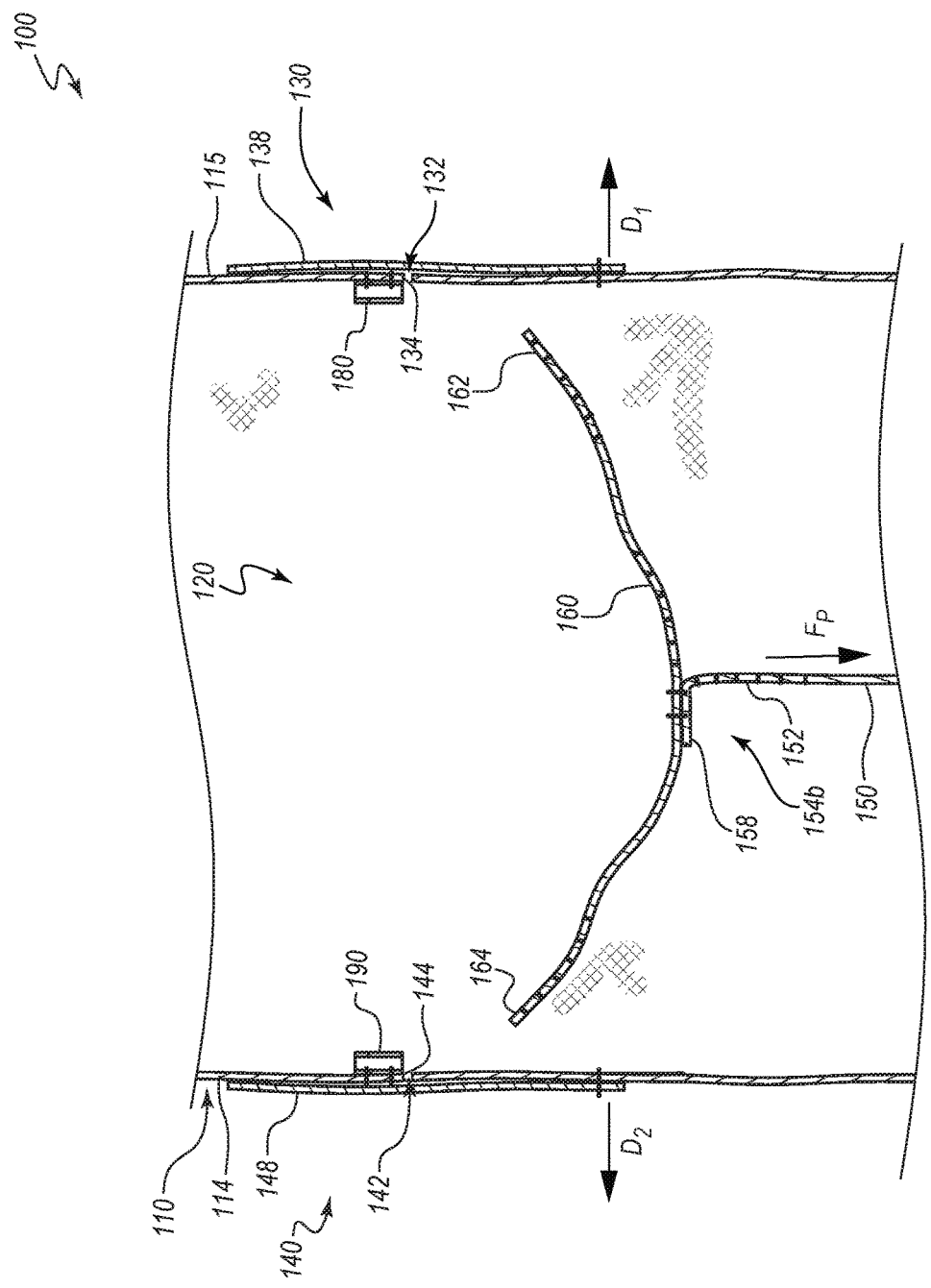
FIG. 4D is a cut-away rear view of the airbag cushion of FIG. 4A with the shear tether and peel tether withdrawn from the venting assembly.

FIG. 4D is a cross sectional view of the airbag assembly 100 with the airbag cushion 110 at least partially inflated, and with the shear tether 160 fully released and drawn away from the vents 130, 140. The airbag cushion 110 is in substantially the same state as in FIG. 4C. The vents 130, 140 may be closed and the airbag assembly 100 is in the second venting state. The first and second ends 162, 164 of the shear tether 160 may be configured to unloop or withdraw through the tether coupling loops 180, 190, respectively after the releasable coupling 170 is released. The airbag cushion 110 has continued to expand downward, exerting peel force $F_P$ on the peel tether 150. The shear tether 160 and peel tether 150 are further coupled by a fixed stitching anchor coupling 154b that remains coupled when the peel force $F_P$ exceeds the release threshold of the releasable coupling 170. In other words, the first end 158 of the peel tether 150 is coupled at a non-releasable anchor coupling 154b to the shear tether 160. By effect of the peel force $F_P$, the peel tether 150 has drawn the first end 162 of the shear tether 160 downward through the tether coupling loop 180 and away from the vent 130. Similarly, the peel tether 150 has drawn the second end 164 of the shear tether 160 downward through the tether coupling loop 190 and away from the vent 140. Drawing the first and second ends 162, 164 of the shear tether 160 downward through the tether coupling loops 180, 190 causes the shear tether 160 and the peel tether 150 to be disposed away from the vents 130, 140 such that the tethers 150, 160 may not incidentally interact with the vents 130, 140 and cause unintended leakage of inflation gas.

FIGS. 5A-5D are detail views of the vent 140 of the airbag assembly 100 at various stages of inflation and illustrating the condition of the vent 140 during each of the venting states. As noted above, the vents 130, 140 are similarly configured such that the vent 130 is substantially performing the same as the vent 140.

Figure 5B:
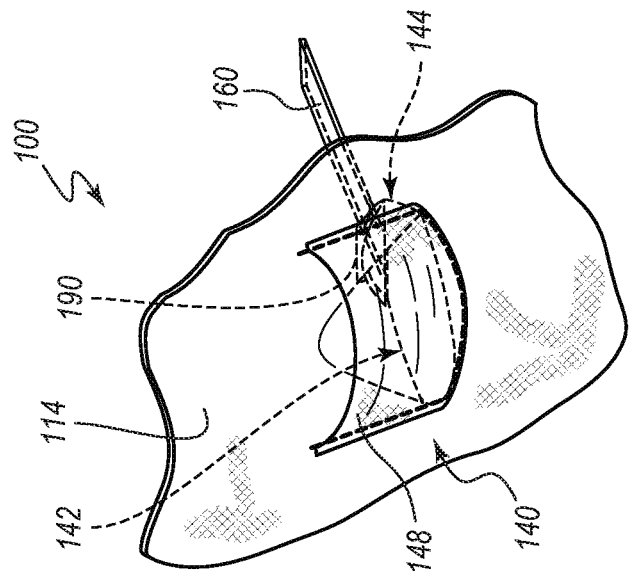
FIG. 5B is a detail view of the vent of the airbag assembly of FIGS. 1B and 1E with the vent in the first venting state.
Figure 5A:
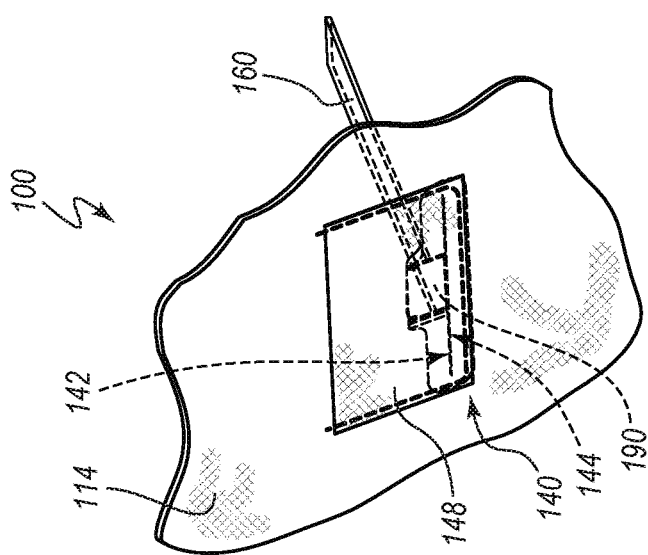
FIG. 5A is a detail view of a vent of the airbag assembly of FIG. 1A when the airbag assembly is at an early stage of deployment such that the vent is substantially closed, having not yet achieved the first venting state.

FIG. 5A is a detail view of the vent 140 when the airbag assembly 100 is at an early stage of deployment such that the vent 140 is substantially closed, having not yet achieved the first venting state. The shear tether 160 is coupled at the tether coupling loop 190. The tether coupling loop 190 is coupled at or near the upper edge 144 of the aperture 142 of the vent 140. As shown in FIG. 5A, the airbag assembly 100 has not inflated sufficiently to draw the shear tether 160 taut such that the shear tether 160 is not yet drawing the upper edge 144 of the aperture 142 of the vent 140 inward. In this condition, the aperture 142 has not yet opened and the vent 140 is not venting inflation gas. The cover panel 148 may lie flat against the side panel 114 and may assist in preventing leakage of inflation gas prior to achievement of the first venting state.

FIG. 5B is a detail view of the vent 140 in the first venting state. As shown in FIG. 5B, the airbag assembly 100 has sufficiently inflated to draw the shear tether 160 taut (see FIG. 1B). The shear tether 160 is looped through the tether coupling loop 190, and the tether coupling loop 190 is coupled at or near the upper edge 144 of the aperture 142 of the vent 140 at an interior surface within an inflatable chamber of an airbag cushion of the airbag assembly 100. The shear tether 160 has drawn the upper edge 144 of the aperture 142 inward to allow inflation gas to vent, thereby placing the airbag assembly 100 in the first venting state. As shown in FIG. 5B, the aperture 142 may be fully open, and the cover panel 148 may be distended outward to accommodate venting of the inflation gas. The first venting state has a high venting capacity, which both allows the airbag cushion (see 110 in FIG. 1B) to continue to expand, and also provides an LRD configuration of the airbag assembly 100 against the possibility of an OOP occupant (see 30 in FIG. 1E). In other words, the first venting state causes the airbag cushion 110 to continue to expand to restrain and protect the occupant 10 when he or she is not in an OOP condition while simultaneously providing an LRD configuration in case the occupant 10 is in an OOP condition. In at least some embodiments, during a collision event having the occupant 10 in an OOP condition, the airbag assembly 100 may not progress to a state of deployment beyond the first venting state.

Figure 5D:
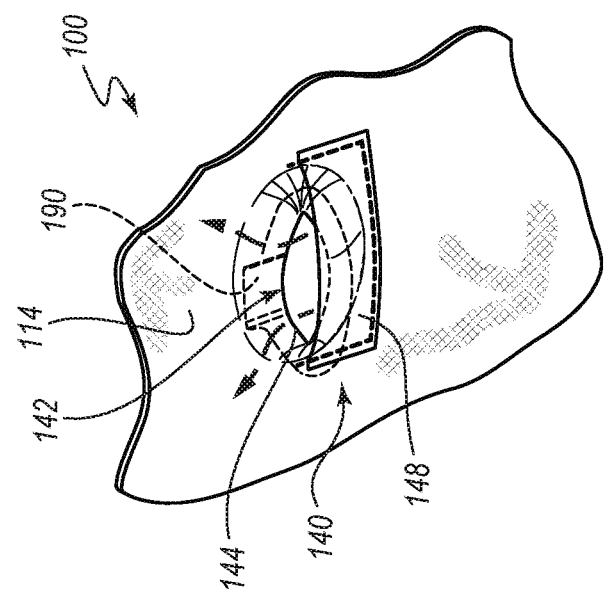
FIG. 5D is a detail view of the vent of the airbag assembly of FIG. 1D with the vent in the third venting state.
Figure 5C:
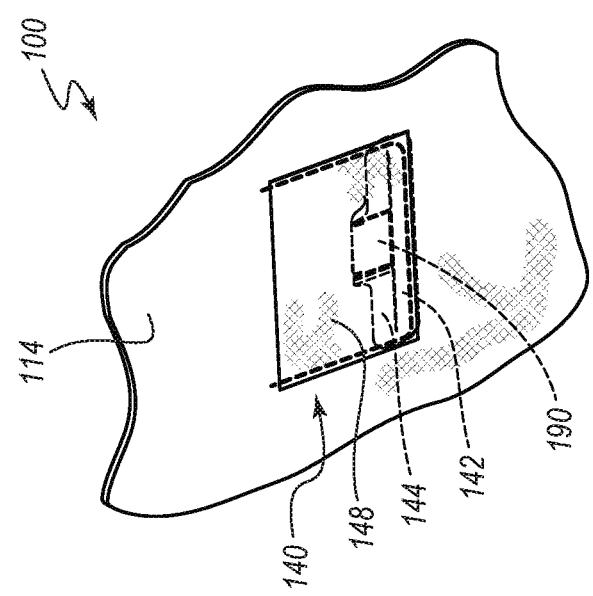
FIG. 5C is a detail view of the vent of the airbag assembly of FIG. 1C with the vent in the second venting state.

FIG. 5C is a detail view of the vent 140 in the second venting state. The airbag assembly 100 has not been engaged by the occupant 10 in an OOP condition, and the airbag cushion 110 has continued to expand such that the peel force (see $F_P$ in FIGS. 4C, 4D) has caused the releasable coupling (170 in FIGS. 4A-4D) to decouple. With the releasable coupling 170 decoupled, the shear tether 160 has also decoupled from the tether coupling loop 190, and the shear tether 160 is no longer drawing the upper edge 144 of the aperture 142 inward, allowing or causing the vent 140 to close, or substantially close, and the cover panel 148 to flatten, or substantially flatten, against the side panel 114. With the vent 140 closed, the airbag assembly 100 achieves the second venting state in which the venting assembly (see 120 in FIGS. 1B-1E) substantially vents no inflation gas such that the airbag cushion 110 may be configured to receive, support, and protect the occupant 10.

FIG. 5D is a detail view of the vent 140 in the third venting state. The airbag assembly 100 has previously achieved the second venting state described above. The shear tether 160 has been drawn away from the vent 140 by the peel force $F_P$ (see FIG. 4D) such that the shear tether 160 may not cause inadvertent leakage of inflation gas through the vent 140. The occupant 10 (see FIG. 5D) has engaged the airbag cushion 110. As the occupant 10 loads the airbag cushion 110, pressure of inflation gas within the airbag cushion 110 may increase. If the pressure of inflation gas within the airbag cushion 110 reaches or exceeds a predetermined pressure, the vent 140 may be forced open to permit the inflation gas to vent from the airbag cushion 110 at a moderate rate to support and protect the occupant 10 during ride down following a collision event.

During the second venting state, as described above, the cover panel 148 may close, or substantially close, by flattening against the side panel 114. With the cover panel 148 substantially flattened against the side panel 114, the cover panel 148 may support the closed state of the vent 140. In at least some embodiments, as pressure within the airbag cushion 110 increases, the pressure against the vent 140, and in particular against the cover panel 148, may increase. If the pressure against the vent 140 and cover panel 148 reaches or exceeds a predetermined pressure, the cover panel 148 may begin to deform or push outward and permit the vent 140 to open so as to vent inflation gas. The pressure of inflation gas needed to distend, or push, the cover panel 148 outward may be configurable by forming the cover panel 148 to a predetermined height. By way of example without limitation, the cover panel 148 shown in FIG. 5D is vertically short compared to the cover panel 148 of FIG. 5C. The cover panel 148 of FIG. 5C may require a higher pressure in order for the cover panel 148 to permit the vent 140 to open, compared to the shorter cover panel 148 of FIG. 5D. By adjusting the height of the cover panel 148 at manufacturing, the release pressure for the third-stage venting can be configured so as to enable venting of inflation gas from the airbag cushion 110 during ride down following a collision event so as to provide optimal support and protection for the occupant 10.

Reference throughout this specification to "an embodiment" or "the embodiment" means that a particular feature, structure, or characteristic described in connection with that embodiment is included in at least one embodiment. Such references, as recited throughout this specification, are not necessarily all referring to the same embodiment.

Similarly, it should be appreciated that in the above description of embodiments, various features are sometimes grouped together in a single embodiment, figure, or description for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows in the claims.

I claim:

1. An airbag assembly comprising:
    an airbag cushion formed of one or more panels that define an inflatable chamber configured to receive inflation gas to inflate the airbag cushion;
    a first vent in a first panel of the one or more panels of the airbag cushion, the first vent comprising a first aperture defined through the first panel;
    a first loop coupled to an interior surface of the airbag cushion within the inflatable chamber at the first panel of the airbag cushion;
    a shear tether, wherein a first end is looped through the first loop, a second end opposite the first end is looped through a second loop, and the shear tether is configured to be drawn taut by expansion of the airbag cushion during inflation;
    a peel tether releasably coupled to the shear tether at a first end of the peel tether, wherein a second end of the peel tether, opposite the first end, is coupled to a bottom portion of the airbag cushion, and the peel tether is configured to be drawn taut as the airbag cushion continues to expand after the shear tether is drawn taut; and
    a releasable coupling to releasably couple the first end of the peel tether to the first and second ends of the shear tether, the releasable coupling configured to resist a shear force transverse to the first panel to maintain the shear tether drawn taut, the shear force produced by expansion of the airbag cushion drawing the shear tether taut, the releasable coupling further configured to release in response to a peel force transverse to the shear force, the peel force produced by expansion of the airbag cushion drawing the peel tether taut.

2. The airbag assembly of claim 1, further comprising a second vent in a second panel of the one or more panels of the airbag cushion, the second vent comprising a second aperture defined through the second panel, and the second loop coupled to another interior surface of the airbag cushion within the inflatable chamber at the second panel.

3. The airbag assembly of claim 1, wherein the first loop is on an inboard side of the airbag cushion, and the second loop is on an outboard side of the airbag cushion.

4. The airbag assembly of claim 1, wherein the first loop is disposed above the first vent.

5. The airbag assembly of claim 1, wherein the releasable coupling comprises one or more breakable stitches that couple the first end of the shear tether, the second end of the shear tether, and the peel tether, and wherein the one or more break stitches are configured to burst when the peel force exceeds a release threshold.

6. The airbag assembly of claim 5, wherein the one or more break stitches of the releasable coupling further couple a middle portion of the shear tether with the peel tether and the first end and second end of the shear tether.

7. The airbag assembly of claim 5, wherein the one or more break stitches form the shape of a heart.

8. The airbag assembly of claim 7, wherein an apex of the heart-shaped break stitches is farthest away from the first end of the peel tether.

9. The airbag assembly of claim 1, wherein the first end of the shear tether is configured to unloop through the first loop, and the second end of shear tether is configured to unloop through the second loop after the releasable coupling is released.

10. The airbag assembly of claim 5, wherein the shear tether and the peel tether are further coupled by a fixed stitching that remains coupled when the peel force exceeds the release threshold.

11. The airbag assembly of claim 10, wherein the fixed stitching is disposed closer to the first end of the peel tether than the one or more break stitches.

12. An airbag assembly comprising:
an airbag cushion that defines an inflatable chamber configured to receive inflation gas to inflate the airbag cushion;
a first vent comprising a first aperture defined through the airbag cushion;
a first loop coupled to the airbag cushion at a first side of the inflatable chamber and adjacent to the first aperture;
a second loop coupled to the airbag cushion at a second side of the inflatable chamber;
a shear tether, wherein a first end is looped through the first loop, a second end is looped through the second loop, the first end and the second end overlap at a coupling zone, and the shear tether is configured to be drawn taut by expansion of the airbag cushion during inflation;
a peel tether including a first end and a second end, the first end of the peel tether overlapping the shear tether at the coupling zone, the second end of the peel tether coupled to the a bottom portion of the airbag cushion, wherein the peel tether is configured to be drawn taut as the airbag cushion expands; and
a releasable coupling to releasably couple the first end of the peel tether to the first and second ends of the shear tether at the coupling zone, the releasable coupling configured to resist a shear force transverse to the first loop, the shear force produced by expansion of the airbag cushion drawing the shear tether taut, the releasable coupling further configured to release in response to a peel force transverse to the shear force, the peel force produced by expansion of the airbag cushion drawing the peel tether taut.

13. The airbag assembly of claim 12, further comprising a second vent in the airbag cushion, the second vent comprising a second aperture defined through the airbag cushion, and wherein the second loop is coupled to the airbag cushion adjacent to the second aperture.

14. The airbag assembly of claim 12, wherein a middle portion of shear tether overlaps the first end of the shear tether, the second end of the shear tether, and the first end of the peel tether at the coupling zone.

15. The airbag assembly of claim 12, wherein the releasable coupling comprises one or more break stitches that couple the first end of the shear tether, the second end of the shear tether, and the peel tether, and wherein the one or more break stitches are configured to burst when the peel force exceeds a release threshold.

16. The airbag assembly of claim 15, wherein the one or more break stitches of the releasable coupling further couple a middle portion of the shear tether at the coupling zone.

17. A tether assembly comprising:
a shear tether that includes a first end, a second end, and a middle portion;
a first loop, wherein the first end of the shear tether is looped through the first loop, and wherein the first loop is configured to couple to an airbag assembly;
a second loop, wherein the second end of the shear tether is looped through the second loop, and wherein the second loop is configured to couple to the airbag assembly; and
a peel tether that includes a first end and a second end, wherein the first end is releasably coupled to the first end of shear tether and the second end of shear tether with a releasable coupling, and wherein the second end is configured to couple to the airbag assembly.

18. The tether assembly of claim 17, wherein the releasable coupling comprises one or more break stitches that are configured to burst at a predetermined peel force on the peel tether.

19. The tether assembly of claim 18, wherein the one or more break stitches form the shape of a heart.

20. The tether assembly of claim 19, wherein an apex of the heart-shaped break stitches is farthest away from the first end of the peel tether.

21. The tether assembly of claim 17, wherein the shear tether and the peel tether are further coupled by a fixed stitching that fixedly couples the peel tether to the shear tether despite release of the releasable coupling.

22. The tether assembly of claim 18, wherein the fixed stitching is disposed closer to the first end of the peel tether than the one or more break stitches.

23. The tether assembly of claim 18, wherein the one or more break stitches of the releasable coupling further couple the middle portion of the shear tether.

24. The tether assembly of claim 23, wherein the first loop is disposed between the first end and the middle portion of the shear tether, and wherein the second loop is disposed between the second end and the middle portion of the shear tether.

* * * * *